US008942677B2

(12) United States Patent
Dixon et al.

(10) Patent No.: US 8,942,677 B2
(45) Date of Patent: Jan. 27, 2015

(54) TRANSIT ACCOUNT MANAGEMENT WITH MOBILE DEVICE MESSAGING

(75) Inventors: Philip B. Dixon, San Diego, CA (US); Timothy Cook, Carlsbad, CA (US); Pradip Mistry, San Diego, CA (US); Janet Koenig, Cardiff by the Sea, CA (US); David L. deKozan, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 132 days.

(21) Appl. No.: 13/610,127

(22) Filed: Sep. 11, 2012

(65) Prior Publication Data

US 2013/0066689 A1    Mar. 14, 2013

Related U.S. Application Data

(63) Continuation of application No. 12/833,394, filed on Jul. 9, 2010, now Pat. No. 8,306,512.

(60) Provisional application No. 61/224,452, filed on Jul. 9, 2009.

(51) Int. Cl.
*H04W 4/24* (2009.01)
*G07B 15/00* (2011.01)
(Continued)

(52) U.S. Cl.
CPC ............... *G07B 15/00* (2013.01); *G06Q 10/08* (2013.01); *G06Q 30/04* (2013.01)
USPC .................. 455/414.1; 455/406; 455/408

(58) Field of Classification Search
CPC .......... G06Q 30/0253; G06Q 30/0277; G06Q 20/401; H04L 29/08108; H04W 4/24
USPC ........... 455/403, 406, 408, 412.1, 414.1, 466, 455/41.1, 41.2; 705/64, 75, 14.15, 14.51
See application file for complete search history.

(56) References Cited

U.S. PATENT DOCUMENTS 5,530,232 A   6/1996   Taylor
5,627,355 A   5/1997   Rahman et al.
(Continued)

FOREIGN PATENT DOCUMENTS

EP   666549 A1   8/1995
EP   1431891 A1  6/2004
(Continued)

OTHER PUBLICATIONS

Author Unknown, "A Pre-Authorised National Payment Card has been launched in Kazakhstan," Open Way Payment Processing Solutions, dated Feb. 12, 2005, found online at http://www.openwaygroup.com/news_card.jsp?dcion=350&rgn=1&1ng=1, 3 pages.
(Continued)

*Primary Examiner* — Cong Tran
(74) *Attorney, Agent, or Firm* — Kilpatrick Townsend & Stockton LLP

(57) ABSTRACT

Embodiments of systems, methods, and machine-readable media are disclosed for enabling the management of a transit user account of a transit system with a mobile device. Embodiments of a transit system utilizing such transit user accounts are also disclosed. Embodiments for enabling a mobile device to manage a transit user account can include receiving an identification code of a fare media and receiving contact information of the mobile device. The transit user account, which can be used in transactions of the transit system associated with the fare media, can be created using user information and a passcode. Additionally, the mobile device can be authenticated by sending at least one message to the mobile device and receiving at least one message from the mobile device.

14 Claims, 23 Drawing Sheets

(51) Int. Cl.
  *G06Q 10/08* (2012.01)
  *G06Q 30/04* (2012.01)

(56) References Cited

U.S. PATENT DOCUMENTS

| | | |
|---|---|---|
| 6,018,717 A | 1/2000 | Lee et al. |
| 6,070,141 A | 5/2000 | Houvener et al. |
| 6,259,769 B1 | 7/2001 | Page et al. |
| 6,726,100 B2 | 4/2004 | Lauper et al. |
| 6,736,322 B2 | 5/2004 | Gobburu et al. |
| 6,913,193 B1 | 7/2005 | Kawan |
| 7,306,143 B2 | 12/2007 | Bonneau, Jr. et al. |
| 7,417,306 B1 | 8/2008 | Jacobsen et al. |
| 7,562,818 B1 | 7/2009 | Bierbaum et al. |
| 7,664,676 B2 | 2/2010 | Van Do et al. |
| 7,766,225 B2 | 8/2010 | Walsh et al. |
| 7,886,974 B2 | 2/2011 | Abbiss et al. |
| 7,991,694 B2 | 8/2011 | Takayama |
| 8,118,223 B2 | 2/2012 | Hammad et al. |
| 8,135,240 B2 | 3/2012 | Satoh |
| 8,240,561 B2 | 8/2012 | Busch-Sorensen |
| 8,306,512 B2 | 11/2012 | Dixon et al. |
| 8,350,668 B2 | 1/2013 | Busch-Sorensen |
| 8,688,554 B2 | 4/2014 | Hammad et al. |
| 2001/0011255 A1 | 8/2001 | Asay et al. |
| 2001/0018660 A1 | 8/2001 | Sehr |
| 2002/0043566 A1 | 4/2002 | Goodman et al. |
| 2002/0099605 A1 | 7/2002 | Weitzman et al. |
| 2002/0170962 A1 | 11/2002 | Besling et al. |
| 2003/0046249 A1 | 3/2003 | Wu |
| 2003/0085272 A1 | 5/2003 | Andrews et al. |
| 2003/0126012 A1* | 7/2003 | Watts et al. ............... 705/14 |
| 2004/0056087 A1 | 3/2004 | Bonneau, Jr. et al. |
| 2004/0177045 A1 | 9/2004 | Brown |
| 2004/0230535 A1 | 11/2004 | Binder et al. |
| 2005/0070257 A1 | 3/2005 | Saarinen et al. |
| 2005/0278216 A1 | 12/2005 | Graves |
| 2006/0064379 A1 | 3/2006 | Doran et al. |
| 2006/0179003 A1 | 8/2006 | Steele et al. |
| 2006/0218038 A1 | 9/2006 | Grider |
| 2006/0237528 A1 | 10/2006 | Bishop et al. |
| 2008/0033880 A1 | 2/2008 | Fiebiger et al. |
| 2008/0051059 A1 | 2/2008 | Fisher |
| 2008/0051122 A1 | 2/2008 | Fisher |
| 2008/0052192 A1 | 2/2008 | Fisher |
| 2008/0052233 A1 | 2/2008 | Fisher et al. |
| 2008/0116264 A1 | 5/2008 | Hammad et al. |
| 2008/0126251 A1 | 5/2008 | Wassingbo |
| 2008/0128513 A1 | 6/2008 | Hammad et al. |
| 2008/0179394 A1 | 7/2008 | Dixon et al. |
| 2008/0183589 A1 | 7/2008 | Dixon et al. |
| 2008/0195428 A1 | 8/2008 | O'Sullivan |
| 2008/0195457 A1 | 8/2008 | Sherman |
| 2008/0201212 A1 | 8/2008 | Hammad et al. |
| 2008/0203151 A1 | 8/2008 | Dixon et al. |
| 2008/0203156 A1 | 8/2008 | Liu et al. |
| 2008/0208681 A1* | 8/2008 | Hammad et al. ............... 705/13 |
| 2008/0255890 A1 | 10/2008 | Hilliard |
| 2008/0288355 A1 | 11/2008 | Rosen |
| 2008/0319901 A1 | 12/2008 | Brown |
| 2009/0055893 A1 | 2/2009 | Manessis et al. |
| 2009/0060393 A1 | 3/2009 | Satoh |
| 2009/0072024 A1 | 3/2009 | Bonneau, Jr. et al. |
| 2009/0103730 A1 | 4/2009 | Ward et al. |
| 2009/0106116 A1 | 4/2009 | Zingsheim |
| 2009/0124234 A1 | 5/2009 | Fisher et al. |
| 2009/0132362 A1 | 5/2009 | Fisher et al. |
| 2009/0144161 A1 | 6/2009 | Fisher |
| 2009/0156190 A1 | 6/2009 | Fisher |
| 2009/0171682 A1 | 7/2009 | Dixon et al. |
| 2009/0184163 A1 | 7/2009 | Hammad et al. |
| 2009/0255996 A1 | 10/2009 | Brown et al. |
| 2009/0265260 A1 | 10/2009 | Aabye et al. |
| 2009/0271211 A1 | 10/2009 | Hammad |
| 2010/0089995 A1 | 4/2010 | El-Awady et al. |
| 2010/0169175 A1 | 7/2010 | Koran |
| 2010/0188195 A1 | 7/2010 | Busch-Sorensen |
| 2010/0224682 A1 | 9/2010 | Busch-Sorensen |
| 2010/0312605 A1 | 12/2010 | Mitchell et al. |
| 2010/0312619 A1 | 12/2010 | Ala-Pietila et al. |
| 2011/0165836 A1 | 7/2011 | Dixon et al. |
| 2011/0165866 A1 | 7/2011 | Dixon et al. |
| 2011/0166914 A1 | 7/2011 | Dixon et al. |
| 2011/0166936 A1 | 7/2011 | Dixon et al. |
| 2011/0166997 A1 | 7/2011 | Dixon et al. |
| 2011/0220718 A1 | 9/2011 | Dixon et al. |
| 2012/0101927 A1 | 4/2012 | Leibon et al. |
| 2012/0278137 A1 | 11/2012 | Dixon et al. |

FOREIGN PATENT DOCUMENTS

| | | |
|---|---|---|
| EP | 2452299 A1 | 5/2012 |
| KR | 10-0467260 B1 | 1/2005 |
| KR | 10-0823210 B1 | 4/2008 |
| WO | 97-10560 A1 | 3/1997 |
| WO | 97/10560 A1 | 3/1997 |
| WO | 2005/013169 A1 | 2/2005 |
| WO | 2006/124808 A2 | 11/2006 |
| WO | 2008/039796 A2 | 4/2008 |
| WO | 2008/070642 A2 | 6/2008 |
| WO | 2009/060393 A2 | 5/2009 |
| WO | 2011-006140 | 1/2011 |
| WO | 2013-173581 A2 | 11/2013 |

OTHER PUBLICATIONS

Author Unknown, "EMV '96 Integrated Circuit Card Application Specification for Payment Systems", Internet Citation, 1996, retrieved on Dec. 29, 2005 from internet at http://www.ttfn.net/techno/smartcards/applspec.pdf, pp. 23-31.

Author Unknown, "TCRP Report 32: Multipurpose Transit Payment Media", Transit Cooperative Research Program, Transportation Research Board, National Research Council, National Academy Press, Washington, D.C., 1998, 140 pages.

International Search Report and Written Opinion of PCT/US2010/041623 mailed on Feb. 8, 2012, 7 pages.

Mastercard Worldwide, "An Introduction to Chip: For Issuers and Acquirers", 2007, 52 pages.

Mosaic Software's Postilion Supports MasterCard's OneSMART Pre-Authorized Solution, Press Release, Bob's Guide, Nov. 2, 2004, 2 pages.

PCT International Search Report and Written Opinion mailed Aug. 18, 2010; International Application No. PCT/US2010/041621, 7 pages.

PCT International Search Report and Written Opinion mailed Oct. 22, 2010; International Application No. PCT/US2010/041625, 8 pages.

PCT International Search Report and Written Opinion mailed Sep. 23, 2010; International Application No. PCT/US2010/041624, 9 pages.

PCT International Search Report and Written Opinion mailed Sep. 7, 2010; International Application No. PCT/US2010/041622, 8 pages.

Author Unknown, "Blacklisting." *Wikipedia, The Free Encyclopedia.* Wikimedia Foundation, Inc., revised Jun. 21, 2009. Accessed at: http://en.wikipedia.org/w/index, 5 pages.

U.S. Appl. No. 13/281,272, filed Oct. 25, 2011, Final Office Action mailed Jan. 15, 2014, 11 pages.

U.S. Appl. No. 12/833,258, filed Jul. 9, 2010, Non-Final Rejection mailed Oct. 4, 2013, 21 pages.

U.S. Appl. No. 12/833,258, filed Jul. 9, 2010, Advisory Action mailed Sep. 9, 2013, 3 pages.

U.S. Appl. No. 12/833,258, filed Jul. 9, 2010, Final Office Action mailed May 10, 2013, 22 pages.

U.S. Appl. No. 12/833,258, filed Jul. 9, 2010, Final Office Action mailed Jun. 6, 2012, 15 pages.

U.S. Appl. No. 12/833,258, filed Jul. 9, 2010, Non-Final Action Office Action mailed Nov. 26, 2012, 21 pages.

U.S. Appl. No. 12/833,258, filed Jul. 9, 2010, Non-Final Action Office Action mailed Dec. 22, 2011, 14 pages.

(56) References Cited

OTHER PUBLICATIONS

U.S. Appl. No. 12/833,378, filed Jul. 9, 2010, Advisory Action mailed Mar. 11, 2013, 3 pages.
U.S. Appl. No. 12/833,378, filed Jul. 9, 2010, Final Office Action mailed Jan. 3, 2013, 12 pages.
U.S. Appl. No. 12/833,378, filed Jul. 9, 2010, Non-Final Office Action mailed Aug. 1, 2012, 15 pages.
U.S. Appl. No. 12/833,358, filed Jul. 9, 2010, Advisory Action mailed Jan. 25, 2013, 3 pages.
U.S. Appl. No. 12/833,358, filed Jul. 9, 2010, Final Office Action mailed Nov. 9, 2012, 10 pages.
U.S. Appl. No. 12/833,358, filed Jul. 9, 2010, Non-Final Office Action mailed Jul. 23, 2012, 14 pages.
U.S. Appl. No. 12/833,386, filed Jul. 9, 2010, Non-Final Office Action mailed Jan. 2, 2013, 17 pages.
U.S. Appl. No. 12/833,404, filed Jul. 9, 2010, Final Office Action mailed Apr. 12, 2013, 12 pages.
U.S. Appl. No. 12/833,404, filed Jul. 9, 2010, Non-Final Office Action mailed Jul. 30, 2012, 9 pages.
U.S. Appl. No. 12/877,691, filed Sep. 8, 2010, Final Office Action mailed Feb. 7, 2013, 9 pages.
U.S. Appl. No. 12/877,691, filed Sep. 8, 2010, Non-Final Office Action mailed Sep. 13, 2012, 8 pages.
U.S. Appl. No. 13/281,272, filed Oct. 25, 2011, Non-Final Office Action mailed Aug. 6, 2013, 8 pages.
Australian Patent Examination Report No. 1 for No. 2010271242 issued May 1, 2014, 3 pages.
Australian Patent Examination Report No. 1 for No. 2010271245 issued Mar. 28, 2014, 5 pages.
PCT International Search Report and Written Opinion mailed Dec. 9, 2013 for PCT/US2013/041351, 11 pages.
U.S. Appl. No. 13/281,272, filed Oct. 25, 2011, Final Office Action mailed Jan. 15, 2014, 15 pages.

\* cited by examiner

TRANSIT ACCOUNT MANAGEMENT WITH MOBILE DEVICE MESSAGING

The present application claims benefit under 35 USC 119 (e) of Ser. No. 12/833,394, filed Jul. 9, 2010, entitled "Transit Account Management With Text Messaging", which claims benefit to U.S. Provisional Application No. 61/224,452, filed on Jul. 9, 2009, entitled "Transit Account Management With Text Messaging," the entire contents of which are incorporated herein by reference for all purposes.

CROSS-REFERENCES TO RELATED APPLICATIONS

The present application is also related to U.S. patent application Ser. No. 12/833,378, filed Jul. 9, 2010 entitled "Predictive Techniques in Transit Alerting;" U.S. patent application Ser. No. 12/833,386, filed Jul. 9, 2010 entitled "ID Application for NFC Phone;" U.S. patent application Ser. No. 12/833,404, filed Jul. 9, 2010 entitled "Reloadable Prepaid Card Distribution, Reload, and Registration in Transit;" and U.S. patent application Ser. No. 12/833,258, filed Jul. 9, 2010, entitled "Proxy-Based Payment System" all of which are filed concurrently herewith and incorporated herein by reference for all purposes.

BACKGROUND

Mobile devices such as mobile phones, personal digital assistants (PDAs), e-book readers, and other devices, are becoming increasingly prevalent in the lives of consumers. As a result, consumers are able to use mobile devices to conveniently communicate and conduct transactions with virtually anyone—including providers of goods and services.

The use of mobile devices to conduct transactions with transit systems is somewhat limited. Instead of having user accounts with information about individual transit users, transit systems typically utilize fare media with stored value that may not require any information regarding the transit user. This makes transactions with a transit system, such as purchases of transit products or retrieval of information regarding fare media particularly difficult.

BRIEF SUMMARY

Embodiments of systems, methods, and machine-readable media are disclosed for enabling the management of a transit user account of a transit system with the mobile device. Embodiments of a transit system utilizing such transit user accounts are also disclosed. Embodiments for enabling a mobile device to manage a transit user account can include receiving an identification code of a fare media and receiving contact information of the mobile device. The transit user account, which can be used in transactions of the transit system associated with the fare media, can be created using user information and a passcode. Additionally, the mobile device can be authenticated by sending at least one message to the mobile device and receiving at least one message from the mobile device. Transactions can include various actions, such as purchasing a new product, reloading an existing product, retrieving account information, and more.

According to some embodiments described herein, mobile device can be enabled to manage a transit user account of a transit system by receiving information associated with a user of the transit system, including an identification code of a fare media for passage of the user of the transit system at access control points of the transit system and information for sending messages to the mobile device. Embodiments further include creating the transit user account, the transit user account enabling the transit system to manage information related to transactions of the user of the transit system. The transit user account can comprise at least a portion of the information associated with the user of the transit system, include a passcode, and be used in transactions of the transit system associated with the fare media. According to some embodiments, the passcode includes a password and/or a personal identification number (PIN). Embodiments further include authenticating the mobile device, which can include using the information for sending messages to the mobile device to send at least one message to the mobile device. Finally, embodiments provide for receiving at least one message from the mobile device. According to some embodiments, this message can include some or all of the information associated with the user of the transit system.

According to some embodiments the information associated with the user of the transit system can include information regarding at least one funding source to fund transactions associated with the account. A funding source can include, for example, a credit or debit card account, a bank account, an e-commerce account, and a prepaid account.

Further embodiments provide for receiving a message from the mobile device to conduct a transaction. A variety of transactions may be conducted, including communicating information regarding the transit user account, transferring value from the at least one funding source to the transit user account, associating a fare media with the transit user account, updating user information, associate a funding source for the transit user account, and activate the transit user account and/or the fare media. Messages can be sent to the mobile device, according to other embodiments. These may be sent using one or more of a short message service (SMS), an email service, an instant messaging service, and an application executed by a mobile phone or other mobile device.

According to yet further embodiments fare media may be authenticated by receiving information read from the fare media. This information can be received with one or more of near field communication (NFC), radio-frequency identification (RFID), a magnetic stripe, a bar code, and a smart card interface.

Further embodiments disclose receiving information associated with the user of the transit system by various means, such as one or more of a personal computer, a ticket booth computer, a telephone, the mobile device, and a transit vending machine.

DETAILED DESCRIPTION

Figure 1:
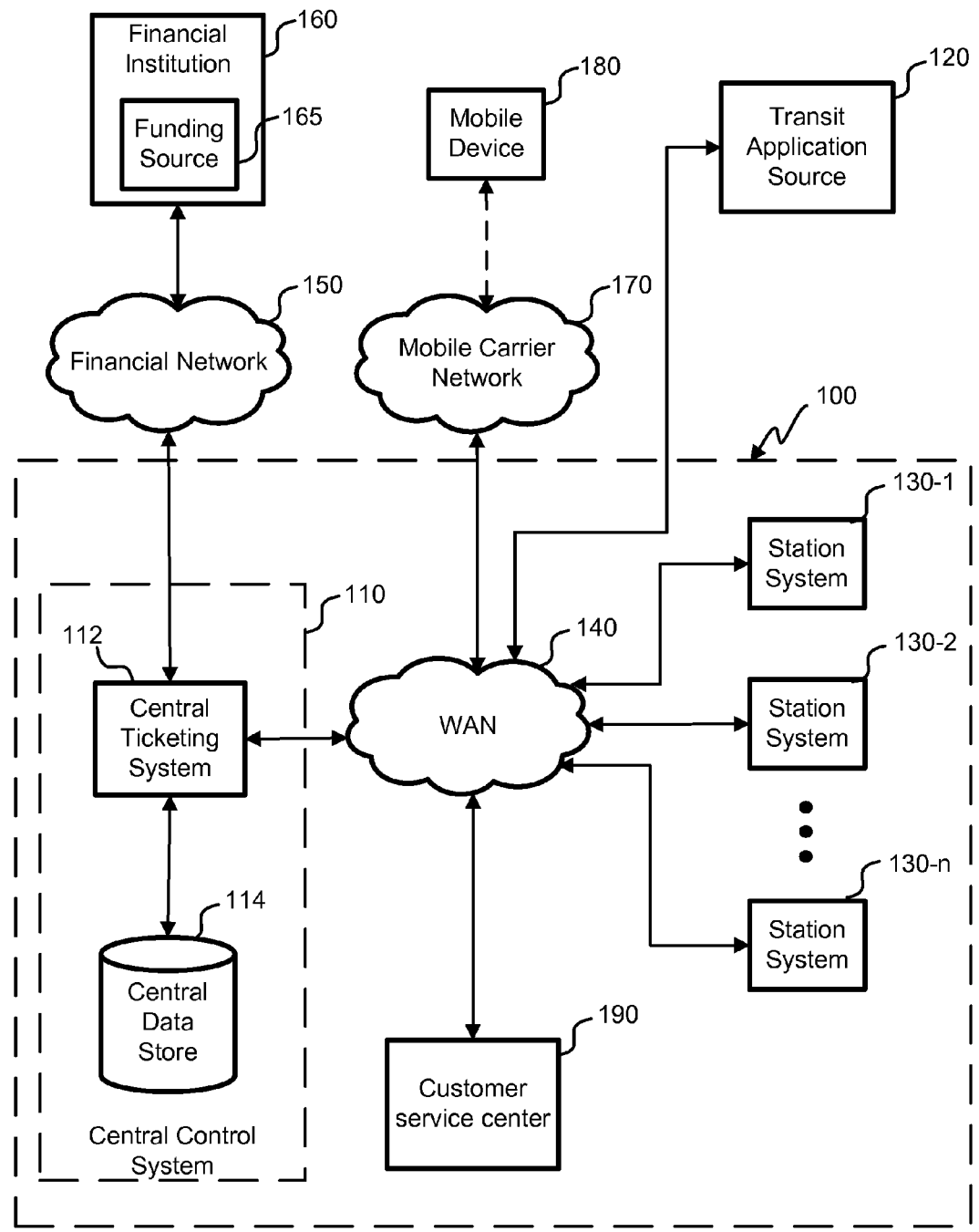
FIG. 1 is a block diagram of an embodiment of a transit system providing transit user accounts for management of transactions of a user of the transit system.

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The term "payment brand" as used herein includes, but is not limited to payment card networks, such as VISA®, MASTERCARD®, AMERICAN EXPRESS®, and DISCOVER®. These networks may issue payment cards, such as reloadable prepaid cards, directly or though a separate card issuer, such as an authorized issuing bank. Furthermore, payment-branded cards as described herein may be "co-branded," meaning that the cards may be accepted, issued, and/or authorized by a transit agency or other entity in addition to a bank and/or payment brand.

Account-based transit systems are uncommon among current transit systems. Because transit systems require quick transactions, it is easier to use stored-value fare media (e.g., fare media, such as a transit fare card, that can store a value and a trip history on the card). However, encoding the value or transit product onto a fare media, rather than associate the value or fare media to a transit user, has its limitations. If the fare media is lost or stolen, it is difficult to remove the value from the lost or stolen fare media and restore it to a transit user. On the other hand, an account-based transit system can enable a transit user to enroll a variety of items as fare media. The fare media can be disabled if lost or stolen, without any lost value to the account. And the account may be linked to a funding source for convenient value top up and product purchases.

FIG. 1 illustrates a block diagram of an embodiment of a transit system 100, in communication with other systems, providing transit user accounts for management of transactions of users of the transit system 100. The transit system can include various forms of transit, including subway, bus, ferry commuter rail, para-transit, etc., or any combination thereof. The transit user account can comprise information regarding a certain user of the transit system 100, such as a name, address, phone number, email address, user identification (such as a unique identifier of the user or other user ID), passcode (such as a password and/or personal identification number (PIN)), an identification code associated with a fare media used to identify a user and/or a transit user account, information regarding user preferences and user opt-in or opt-out selections for various services, product(s) associated with the transit user account, a value and/or credit associated with the product(s), information regarding a funding source 165 for the transit user account, and more. The transit user account can further comprise transaction information, such as product information and a payment amount. A transit user may request a transit user account and provide the information listed above by phone (such as a call to a customer service center 190 maintained and/or provided by the transit service provider of the transit system 100), on the Internet, at ticket booth, at a ticket venting machine, or by other means. A central ticketing system 112, which can comprise of one or more servers and/or other computing systems having processors, memories, and network interfaces for processing and communicating information. The central ticketing system 112 can use the information provided by the user to create the transit user account, which can be stored and/or maintained on a database, such as a central data store 114 of a central control system 110.

A funding source 165 for a transit user account can provide funding to purchase products of the transit services system. It can be external to the central control system 110 and maintained, for example, by a financial institution 160. Such a funding source 165 may include a savings or checking account, a prepaid account, a credit account, an e-commerce account (such as a PAYPAL® account), or more, which can transfer funds via automated clearing house (ACH) or other means. If a transit user account comprises information regarding a funding source 165 for the account, the central ticketing system 112 can use the information to fund purchases or other transactions of a user of the transit system 100. These transactions can be made at stations, on the Internet, by phone, text, email, or a variety of other different ways, and transaction information can then be sent to the central ticketing system 112 to update the transit user account associated with the transactions and reconcile payments and purchases with the funding source 165. The central ticketing system 112 can communicate with the financial institution 160 (or other entity maintaining the funding source 165) through a financial network 150.

The central ticketing system's reconciliation with a funding source 165 may vary depending on one or more products associated with the transit user account and the functionality desired by a transit services provider. For example, the transit user account may include a running balance mirroring a balance of the funding source 165. In such a case, transactions, such as passage of a user at an access control point (such as a turnstile, faregate, platform validator, para-transit vehicle, bus, conductor handheld unit, or fare box at a entry, exit, or other location of a transit station) can be recorded and/or tracked by the central ticketing system 112 and reconciled, on a per-transaction basis and/or collectively with other transactions. Along these lines, the central ticketing system 112 may reconcile payment for the transactions with the funding source 165 as the transactions are received and/or on a scheduled basis, such as on an hourly or daily basis.

Additionally or alternatively, when transit products or services are associated with a transit user account, the central ticketing system 112 can draw funds from a funding source 165 less frequently. For example, a transit product can include a certain number of rides or an unlimited number of rides for a certain period of time. In this case, the central ticketing system 112 can track transactions associated with the passage of a user at an access control point (i.e., transactions in the transit system associated with a ride), but may only need to reconcile with the funding source 165 once, for the purchase of the transit product.

The transit user account may further include information regarding a user's preferences with regard to funding. For example, the transit user account may be configured to automatically draw a certain amount of funds from the funding source 165 each month to pay for a certain transit product or service, or to add value and/or credits to an existing transit product or service. The value and/or credits can include a monetary credit, a usage credit, and/or a usage period. Additionally or alternatively, the transit user account can be configured to automatically withdraw a certain amount of funds from the funding source 165 to add additional value and/or credits to an existing product when the value and/or credits of the existing product drops below a certain threshold level. Various other configurations are allowable by the transit user account. It will be understood that other systems of the transit system 100, such as a station system 130, may draw funds from a funding source 165. Moreover, because cash payments can also be used to fund transactions associated with a transit user account, the transit user account may not require funding source 165.

Transactions of a user, such as passage at a transit access control points, can frequently occur at stations of the transit system 100, although it will be understood that access control points can exist elsewhere, such as on busses or trains. Station systems 130 can gather information regarding transactions and communicate the information to the central ticketing system 112 using a wide area network (WAN) 140. The WAN 140 can include one or more networks, such as the Internet, that may be public, private, or a combination of both. The WAN 140 could be packet-switched or circuit-switched connections using telephone lines, coaxial cable, optical fiber, wireless communication, satellite links, and/or other mechanisms for communication. Communication between the station systems 130 and the central control system 110 may be in real time or periodic. Thus, the usage of fare media—such as a transit card, identification card, mobile phone, or other item presented for passage at access control points—throughout the transit system 100 can be tracked.

In this embodiment, a central ticketing system 112 and a central data store 114 are shown for the central control system 110. As discussed above, central ticketing system 112 receives periodic reports upon how credits or debits are being processed throughout the system 100. Additionally, changes in schedules, ticket prices, and delay notifications can be communicated from the central control system 112 to the station systems 130 via the WAN 140.

A mobile device 180 may be communicatively coupled with the central control system 110. Such a mobile device may be a smart phone or other mobile phone (including a near-field-communication (NFC)-enabled mobile phone), a tablet personal computer (PC), a personal digital assistant (PDA), an e-book reader, or other device. In transit system 100, a communicative link from mobile device 180 to central ticketing system 112 can be provided by a mobile carrier network 170 in communication with WAN 140. Mobile device 180 can thereby communicate with the central ticketing system 112 to access and/or manage information of a transit user account. Furthermore, the central ticketing system 112 can send messages to the mobile device 180, providing transit, account, and/or advertisement information to a user of the transit system 100 in possession of the mobile device 180. Such messages may be based on, among other things, opt-in or opt-out selections and/or other user preferences as stored in a transit user account.

A transit user can use mobile device 180 to download a transit application from a mobile application source 120. The transit application source 120 may be an application store or website provided by a mobile carrier, the hardware and/or software provider of the mobile device 180, and/or the transit service provider. The transit application can be uploaded or otherwise provided to transit application source 120 by the transit service provider. As detailed below, the transit application can provide additional functionality of mobile device 180, including enabling an NFC-enabled mobile device to be used as fare media and access control points of the transit system 100.

Figure 2A:
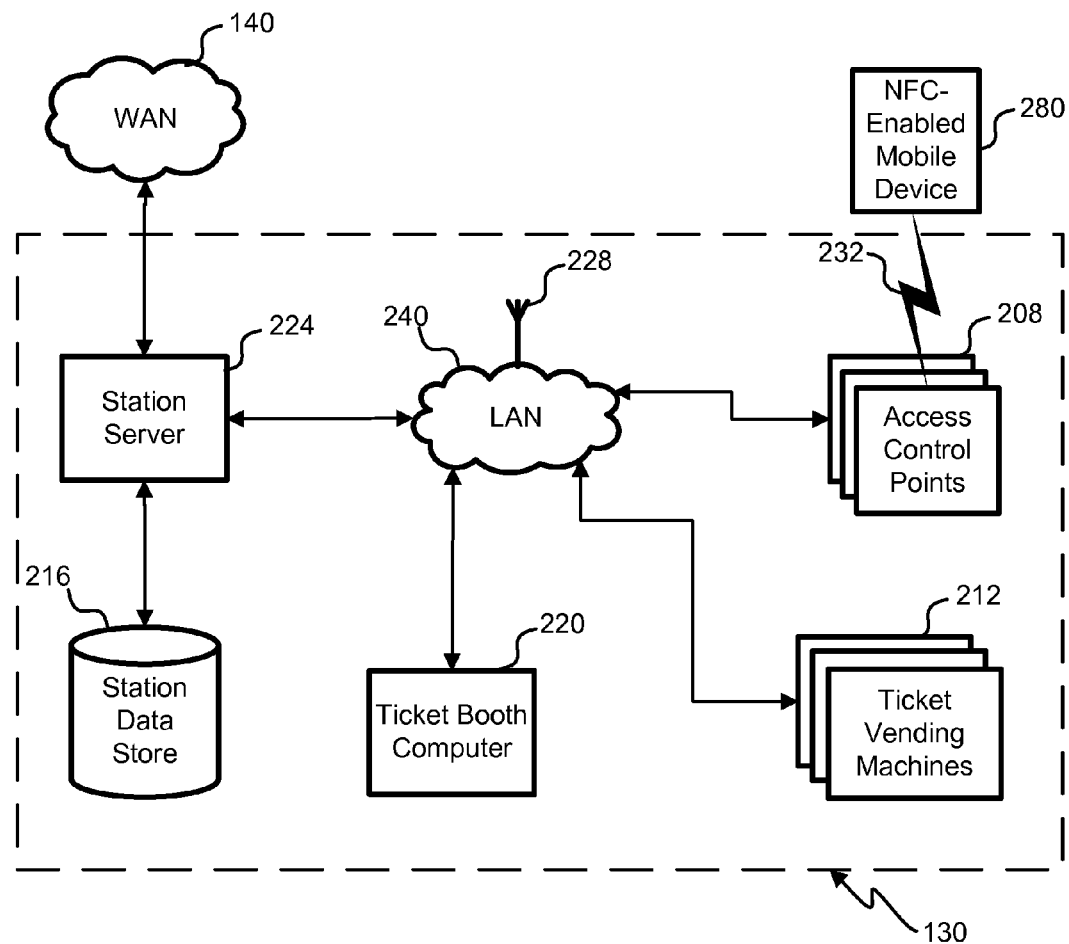
FIG. 2A is a block diagram of an embodiment of a transit station system, illustrating a near-field-communication-enabled mobile device communicating with access control points.

FIG. 2A shows a block diagram of an embodiment of a transit station system 130. As discussed above, transit system 100 can include various forms of transit, such as subway, bus, ferry, commuter rail, para-transit, and more. Because different forms of transit may require different functionality, various transit station systems 130 may have some or all of the components shown in the block diagram. A local area network (LAN) 240 couples the various systems together and could include point-to-point connections, packet switched connections, wireless connections, and/or other networking techniques.

A station computer server 224 can be coupled to the WAN 140 to allow communication with the central ticketing system 112. Processing of local information can be performed on the station computer server 224. For example, fare information, schedule information, delay update information, and other transit related information can be processed at the computer server 224 and communicated to the various other machines in the transit system 100.

A ticket booth computer 220, access control points 208, and transit vending machines (TVMs) 212 can communicate with the central ticketing system 112 through the station computer server 224 or directly with the central ticketing system 112 through LAN 240 or WAN 140 (e.g., the Internet). According to some embodiments, access control points 208 collect information from a user at various locations in the transit station system 130, and can come in various forms such as turnstiles, faregates, platform validators, para-transit vehicles, busses, conductor handheld units, and/or fare boxes. The access control points 208 can communicate with the station server 224 and/or central ticketing system 112 to determine whether to grant a user access when fare media has been presented at the access control points 208. If access control points communicate with a station server 224 during such transactions, identification codes of fare media, which can be used to link a transaction with a transit user account, may be stored on lists in the station data store 216. These lists can be updated on a regular basis to reflect other transactions of the fare media throughout the transit system 100. In other embodiments, discussed below, identification codes of fare media are stored at access control points 208.

The access control points 208, TVMs 212, and one or more ticket booth computers 220, can communicate with the station server 224 via the LAN 204. This communication can be transmitted via a physical connection or wireless connection via one or more antennas 228. Transactions at access control points 208, TVMs 212, and one or more ticket booth computers 220 can be communicated to the station server 224, stored at station data store 216, and/or transmitted to central ticketing system, which can update information in a transit user account accordingly.

Various media may be used as transit fare media in the transit system 100. For example, a user may utilize an NFC-enabled mobile device 280 to transmit an identification code and/or other information to an access control point 208 for passage at the access control point 208. The transmission 232 may be wireless, such as by NFC communication. Additionally or alternatively, other media having a unique identification code, readable by access control points 208, may be used. By way of example, but not by limitation, this can include magnetic stripe cards, radio-frequency identification (RFID) tags and/or RFID-tagged items, a smart card, and items having a bar code.

Figure 2B:
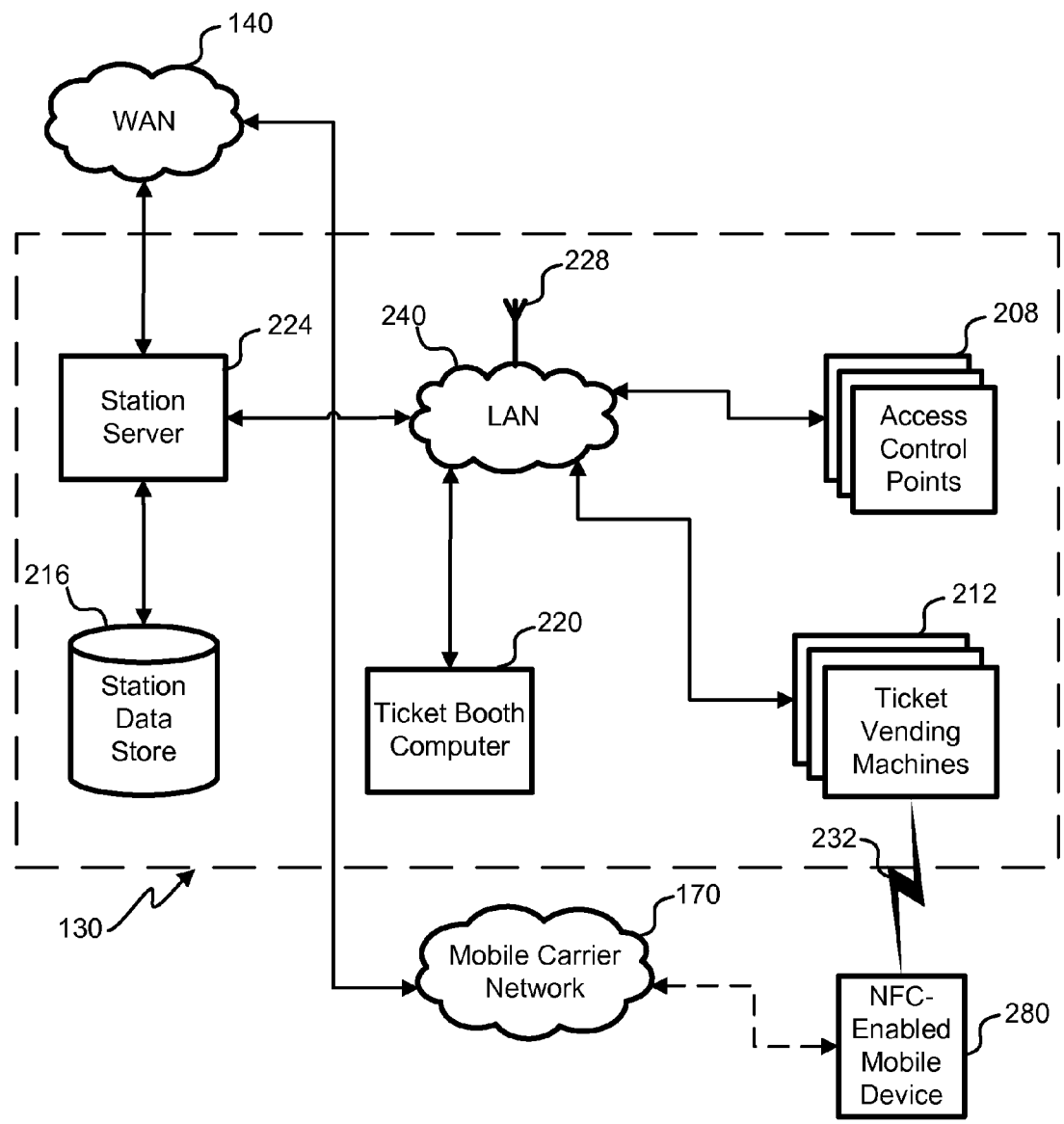
FIG. 2B is a block diagram of an embodiment of a transit station system 130, illustrating interaction between a near-field-communication-enabled mobile device connected with a mobile carrier network and ticket vending machines.

FIG. 2B is a block diagram of an embodiment of a transit station system 130, illustrating interaction between NFC-enabled mobile device 280 connected with a mobile carrier network 170 and TVMs 212. As illustrated here, TVMs 212 may interact directly with a NFC-enabled mobile device 280 through, for example, an NFC connection 232. Although communication 232 may be two way, NFC-enabled mobile device 280 may simply communicate an identification code to TVM 212. This can be done, for example, to authenticate the NFC-enabled mobile device 280 for use as fare media in the transit system 100.

Additionally or alternatively, a transit user can register the NFC-enabled mobile device 280 or other mobile device 180 for managing a transit user account. (Although FIG. 2B shows an NFC-enabled mobile device 280, a mobile device does not need NFC capabilities to be used to manage a transit user account.) According to the illustrated embodiment, this can be done by entering messaging information of the NFC-enabled mobile device 280 into TVM 212. Alternatively entering messaging information could be enabled at a personal computer connected to the internet, or through another device such as a ticket booth computer 220, or customer service agent at customer service center 190. TVM 212 can then generate a message, or request that a message be generated by another system such as station server 224 or central ticketing system 112, which is then sent to the NFC-enabled mobile device 280 through the mobile carrier network 170. This message can be, for example, an short message service (SMS) message or an email, sent to the NFC-enabled mobile device 280. The NFC-enabled mobile device 280 can, in turn, return a message to the TVM 212, station server 224, or central ticketing system 112 to authenticate the NFC-enabled mobile device 280 with the transit system 100. Not only can a user manage a transit user account with the NFC-enabled mobile device 280 or other mobile device 180, but a user may also manage the account by utilizing the TVM It will be understood that a variety of other techniques may be used to register NFC-enabled mobile device 280 or another mobile device 180 for managing a transit user account. For example, a user may use mobile device 180 to send a message to central ticketing system 112, which can, in turn, send a reply message to the mobile device directing the user to enter an access code into a TVM 212 to register the mobile device 180 for managing a transit user account. Other methods for registering and/or authenticating the mobile device are contemplated, such as through the internet, over the web, through a customer service agent, and/or through a customer service kiosk or manned ticket booth location.

Figure 2C:
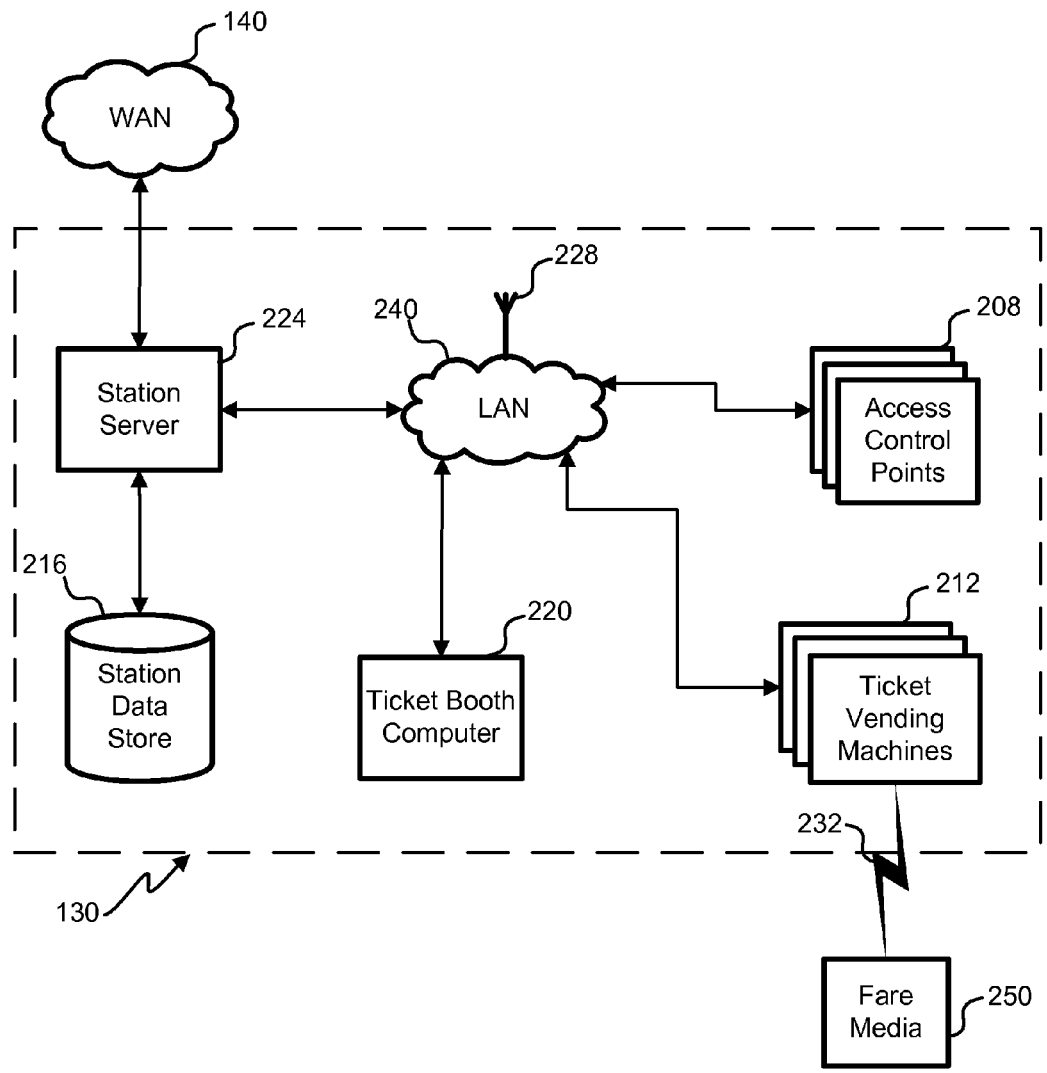
FIG. 2C is a block diagram of an embodiment of a transit station system 130, illustrating how fare media may interact with ticket vending machines.

FIG. 2C is a block diagram of an embodiment of a transit station system 130, illustrating how fare media 250 may interact with TVMs 212. As with the NFC-enabled mobile device 280 of FIG. 2B, a transit fare media 250 may be authenticated at a TVM 212 for use in the transit system 100 and/or to link an identification code of the fare media with a transit user account. In addition to a mobile device 180, such as an NFC-enabled phone or other NFC-enabled mobile device 280, transit fare media 250 can include magnetic stripe cards, radio-frequency identification (RFID) tags and/or RFID-tagged items, a smart card, and items having a bar code. Fare media 250 does not have to be issued by a transit service provider as long as the information communicated by the fare media 250 to the TVM 212 (and subsequently to access control points 208 for passage in the transit system 100) serves to uniquely identify the fare media 250.

All or part of the information communicated by the fare media 250 can be used as an identification code to identify the transit fare media 250. This identification code can comprise one or more fields of data including or based on information such as a name, a birth date, an identification number, a social security number, a drivers license number, a media access control (MAC) address, an electronic serial number (ESN), an international mobile equipment identifier (IMEI), and more. Because the identification code is unique, it can be associated with a transit user account, and utilized by a user at a TVM 212 to access and/or update information associated with the transit user account.

In some instances, an identification code may be assigned by a transit service provider and written to the fare media 250, such as an NFC-enabled mobile device 280. For example, a transit application running on an NFC-enabled phone can generate or otherwise provide an identification code to be transmitted from the phone at access control points 208 of the transit system 100. In other instances, if TVM 212 is utilized to enable a user to create a transit user account, the TVM 212 may also write an identification code to an unused portion of a memory of the fare media, such as integrated circuit chip file space on a smart card or an NFC component on the NFC-enabled mobile device 280.

Encryption and/or other security measures may be taken to mitigate the risk of counterfeit or fraudulent identification codes. For example, checksum formulas and/or digital fingerprints can be used. Additionally or alternatively, fare media 250 may be configured to generate a transaction sequence number, making use of encryption technology and key(s) to generate a cryptogram for the transaction. Every use of the fare media 250 can provide a different sequence number and different resulting cryptogram. Access control points 208 can have the cryptographic algorithm and encryption key(s) securely installed to authenticate the fare media 250. An authenticity check can therefore be conducted without communicating with a station server 224 or central ticketing system 112. As discussed below, access control points 208 can additionally make use of lists to prevent other types of fraud.

Figure 3A:
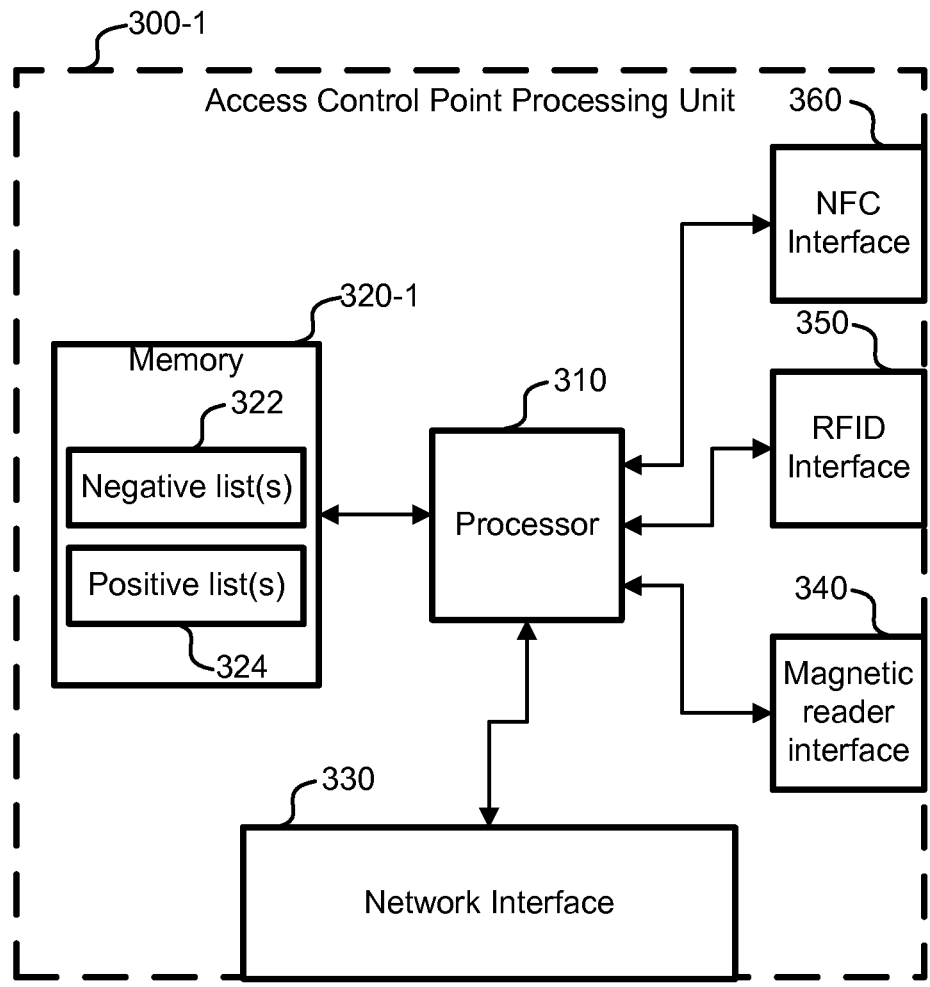
FIG. 3A is a simplified block diagram of an embodiment of an access control point processing unit.

FIG. 3A is a simplified block diagram of an embodiment of an access control point processing unit 300-1, which can be coupled with and/or integrated into access control points 208 of a transit system 100 and can control certain physical properties of access control points 208 such as to allow or deny passage of a user. Among other things, the access control point processing unit 300-1 can be used to read an identification code from fare media and determine whether to permit passage of a user at the access control point 208. Interfaces such as an NFC interface 360, RFID interface 350, and/or magnetic reader interface 340, can be used to receive information from fare media 250, including an identification code. The identification code can then be sent to processor 310.

In addition to performing any decryption and/or verifying any security features as described above, the processor 310 can compare the identification code against lists stored in memory 320-1 and/or other data store to determine whether to allow passage of the user at the access control point 208. Lists can be generated and maintained from a central system, such as the central ticketing system 112. The central system can send updated list information to station server 224 via WAN 140 or directly with the central ticketing system 112 through WAN 140 (e.g., the Internet) or LAN 240. The station server 224 can store updated list at the station data store 216 and/or communicate the updated list information via LAN 240 to access control point processing unit 300-1, which receives the information at network interface 330.

These lists can include one or more positive lists 324 and/or negative lists 322. If, for example, the identification code is found on the negative list 322, the processor 310 can determine to deny passage of the user. On the other hand, if the identification code is found on a positive list 324, the processor 310 can determine to allow passage of the user. The lists, which can include information in addition to an identification code, such as a product associated with the identification code, enable a quick determination of whether to allow or deny passage of the user at the access control point 208. Once the determination is made, the processor 310 can cause the access control point processing unit 300-1 to physically allow or deny passage of a user at the access control point 208.

Depending on the preferences of a transit services provider, the processor can be configured to either permit or deny passage of a user at an access control point 208 if an identification code is found on both lists or is not found on either list. For example, the processor 310 may be configured to always deny passage if an identification code is found on a negative list 322, regardless of whether it is also found on a positive list 324. If a positive list 324 is not intended to be an exhaustive list of acceptable identification codes, the processor 310 may be configured to allow passage of a user where an identification code is not found on either positive 324 or negative lists 322.

Although logic may be implemented at the processor 310 of an access control point processing unit 300-1 to determine what to do in instances where an identification code appears on both positive 324 and negative lists 322, or does not appear on either list, it will be understood that precautions may be made to ensure one or both of these scenarios does not happen. Logic can be implemented at the system generating the lists, such as the central ticketing system 212, to ensure that an identification code does not appear on both lists. For example, if an identification code is put on a positive list 324, the system generating the lists could ensure that the identification code is removed from any and all negative lists 322, if necessary. By generating lists in this manner, the processing load of processor 310 may be reduced, which may be desirable in certain embodiments of access control point processing unit 300-1.

The access control point processing unit 300-1 can also log transaction information in memory 320-1 and/or communicate the transaction information to station server 224 with a network interface 330. The station server 224 can, in turn, send the transaction information to the central ticketing system 112, which can store the information in central data store 114. The transaction information can be used to update transit user accounts associated with the transactions and to settle with a funding source 165. If, for example, a product associated with a transit user account expires, or central ticketing system 112 is unable to draw funds from a funding source 165 to settle a transaction associated with a transit user account, the central ticketing system can put an identification code associated with the transit user account on a negative list 322 and propagate the negative list 322 throughout the transit system 100.

Figure 3B:
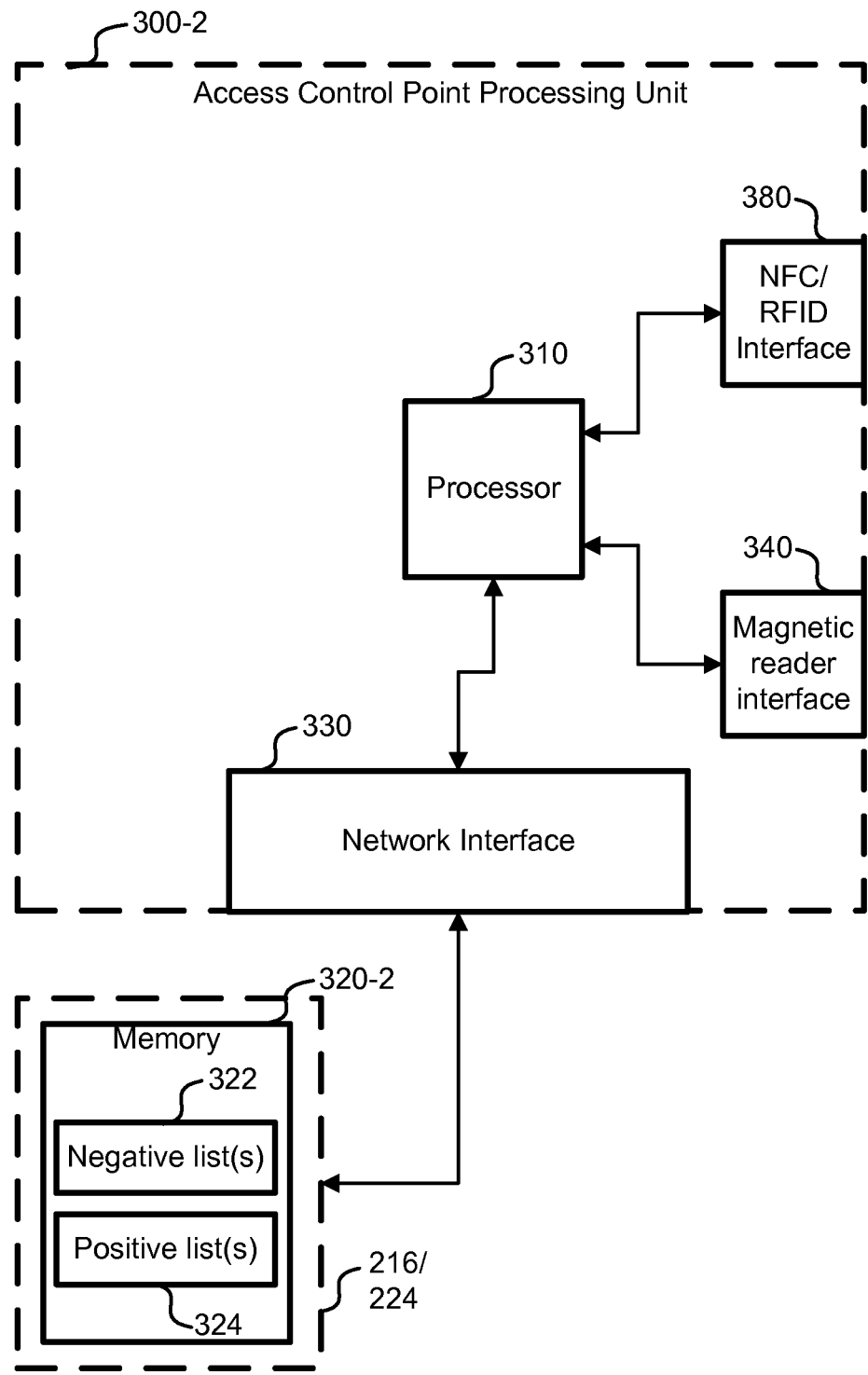
FIG. 3B is a simplified block diagram of an alternative embodiment of an access control point processing unit.

FIG. 3B is a simplified block diagram of an alternative embodiment of an access control point processing unit 300-2. As illustrated, a memory 320-2 comprising positive list(s) 324 and negative list(s) 322 may be located at a source external to access control point processing unit 300-2. The external source can include, for example, station server 224 or station data store 216. In such an embodiment, the processor 310 may communicate with the external source in deciding whether to allow or deny passage of a user at an access control point 208, or the decision may be made by station server 224. In either case, it is desirable to make the decision quickly, often in 500 milliseconds or less. Thus, in this embodiment, it can be desirable that the connection between access control point processing unit 300-2 and the external source having memory 320-2 have sufficient speed and minimal latency to provide for a quick decision.

Access control point processing unit 300-2 further illustrates how NFC and RFID interfaces may be combined. Because NFC and RFID technologies and standards can largely overlap, it will be understood that the hardware and software required to communicate using those standards can be combined into one unit. This access control point processing unit 300-2 includes NFC/RFID interface 380, which can receive information such as an identification code from fare media 250 having RFID tags and/or NFC capabilities (such as an NFC-enabled mobile device 280 or contactless payment card).

As discussed above, embodiments of the transit system 100 described herein provide for the use of NFC-enabled mobile devices 280 as fare media 250 at access control points 208. Thus, instead of swiping a transit fare card or presenting another form of fare media 250 at a turnstile, faregate, platform validator, para-transit vehicle, bus, conductor handheld unit, fare box, etc. for passage, a user may simply present an NFC-enabled mobile device 280 or contactless payment card. The NFC-enabled mobile device 208 potentially may be used for other transactions of the transit system 100, such as the purchase of a transit product. To enable this functionality, a transit application, such as a mobile phone application, can be downloaded to the NFC-enabled mobile device 280 to ensure that the NFC-enabled mobile device 280 transmits an acceptable identification code at an access control point 208 of the transit system 100. Additionally, a user can register the NFC-enabled mobile device 280 or otherwise provide the corresponding identification code to the transit service provider to ensure the identification code is linked to a transit user account. It will be understood that mobile devices may be configured to be used as transit fare media in a similar manner by utilizing different communication technologies, such as by transmitting other types RF signals (e.g., Bluetooth and/or WiFi), by displaying barcodes for scanning, or by other means of communication at access control points 208.

A transit application provided by the transit service provider can include various other features besides providing for an NFC-enabled mobile device 280 to be used as fare media 250 at access control points. Additional functions of a transit application can include communicating with the transit system 100 to provide account management, as discussed in detail below. Additionally, the transit application can provide marketing messages, real time transit updates, locations of nearby transit stations, and more. With such functionality, the transit application may be used on other devices, including mobile devices 180 without NFC capabilities.

Figure 4:
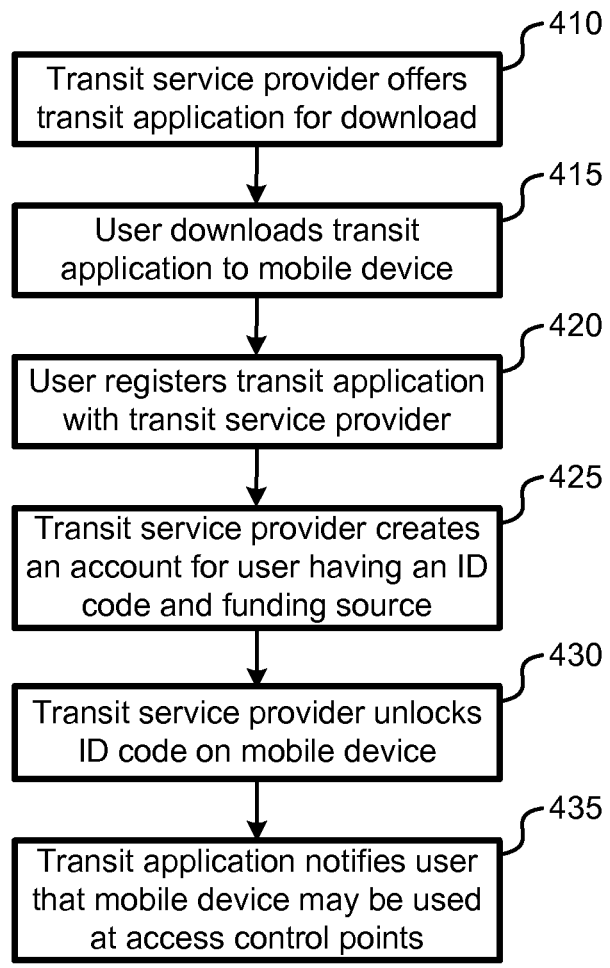
FIG. 4 is a diagram illustrating an embodiment of a method downloading an application for a near-field-communication-enabled mobile device and unlocking an identification (ID) code for the near-field-communication-enabled mobile device.

FIG. 4 is a diagram illustrating an embodiment of a method downloading a transit application for a NFC-enabled mobile device 280 and unlocking an ID number for the NFC-enabled mobile device 280. As described above, transit system 100 can provide for an NFC-enabled mobile device 280, such as an NFC-enabled mobile phone, to be used as media fare at access control points 208. This can be accomplished by providing a transit application for download onto the NFC-enabled mobile device 280. The diagram of FIG. 4 illustrates an embodiment of this process.

At block 410, the transit service provider can offer the transit application for download. As discussed above, the transit service provider can upload or otherwise provide the transit application to a mobile carrier or the hardware and/or software provider of the NFC-enabled mobile device 280 (or other mobile device 180). Additionally or alternatively, the transit services provider may provide the transit application directly to users via internet download or by physical media having the transit application. At block 415, a user downloads the transit application to the NFC-enabled mobile device 280. It will be understood that, the transit application may be provided to the NFC-enabled mobile device 280 by means other than download.

At block 420, the user registers the transit application with the transit provider, which, at block 425, creates a transit user account for the user having an identification code and a funding source. Steps at blocks 420 and 425 may be performed at the same time. A user may register the transit application with the transit service provider by phone, mail, Internet, or from within the transit user application itself, which can utilize a phone or Internet connection to contact the transit service provider to register the application. The user may also provide additional user information, as described above for the creation of a transit user account, if requested by the transit service provider. The transit service provider can then create an transit user account comprising an identification code and information regarding a funding source 165. The transit service provider can further associate additional user information, if provided, with the transit user account, including a payment amount for a related transaction. Some or all of the information used to create the account may be provided by the user and/or the transit application running on the NFC-enabled mobile device 280.

As indicated above, the identification code can be generated, either by the transit service provider or the transit application. The identification code itself may comprise, or be based on, multiple data fields, such as a name, a birth date, an identification number, a social security number, a drivers license number, a media access control (MAC) address, an electronic serial number (ESN), an international mobile equipment identifier (IMEI), and more. It may further include security and/or encryption measures, as described above, to reduce the risk of fraud. The identification code may be stored on secured memory of the NFC-enabled mobile device 180 to further reduce the risk of fraudulent activity. However, unlike other forms of transit fare media utilized in transit systems 100 having transit user accounts, such as prepaid cards or other payment cards, the identification code does not need to be kept a secret. Thus, unlike payment cards, there are no industry data security standards that require additional overhead that would cause delays in the issuance of an identification code.

At block 430, the transit service provider unlocks the identification code on the NFC-enabled mobile device 280. By "unlocking" the identification code, the NFC-enabled mobile device 280 is enabled for use as transit media at access control points 208 of the transit system 100. This can entail activating the NFC functionality of the NFC-enabled mobile device 280 to communicate the identification code (and other information, if required) to an access control point processing unit 300 at an access control point 208. Likewise, the transit service provider can determine to lock, or deactivate, the identification on the NFC-enabled mobile device 280 under various circumstances, such as when NFC-enabled mobile device 280 has been reported lost or stolen, when the transit user account with which the identification code is associated no longer has a valid funding source 165, if transit system 100 was unable to reconcile the value of a transaction with the funding source 165, at the expiration, invalidation, and/or temporary deactivation of a transit fare product associated with the identification code, or if fraud or other suspicious activity has been associated with the transit user account and or NFC-enabled mobile device 280. In such instances, the transit application can deactivate the NFC functionality of the NFC-enabled mobile device 280 to discontinue communicating the identification code at access control points 208 and/or remove the ID code completely from the mobile device so as not to be recognized by the control points 208.

Locking and unlocking the identification code of a NFC-enabled mobile device 280 may be performed in different ways. For instance, the transit service provider can communicate information (e.g., activation or deactivation information) to the transit application by over-the-air (OTA) update. Additionally or alternatively, the transit application can, at scheduled times or upon certain events, communicate with the central ticketing system 112 of a transit service provider via WAN 140 to receive unlocking or locking instructions for the NFC-enabled mobile device 280. Once the identification code on NFC-enabled mobile device 280 is unlocked after the transit application has been registered with the transit services provider, the transit application can notify the user that the NFC-enabled mobile device 280 may be used as fare media at access control points at block 435.

Figure 5A:
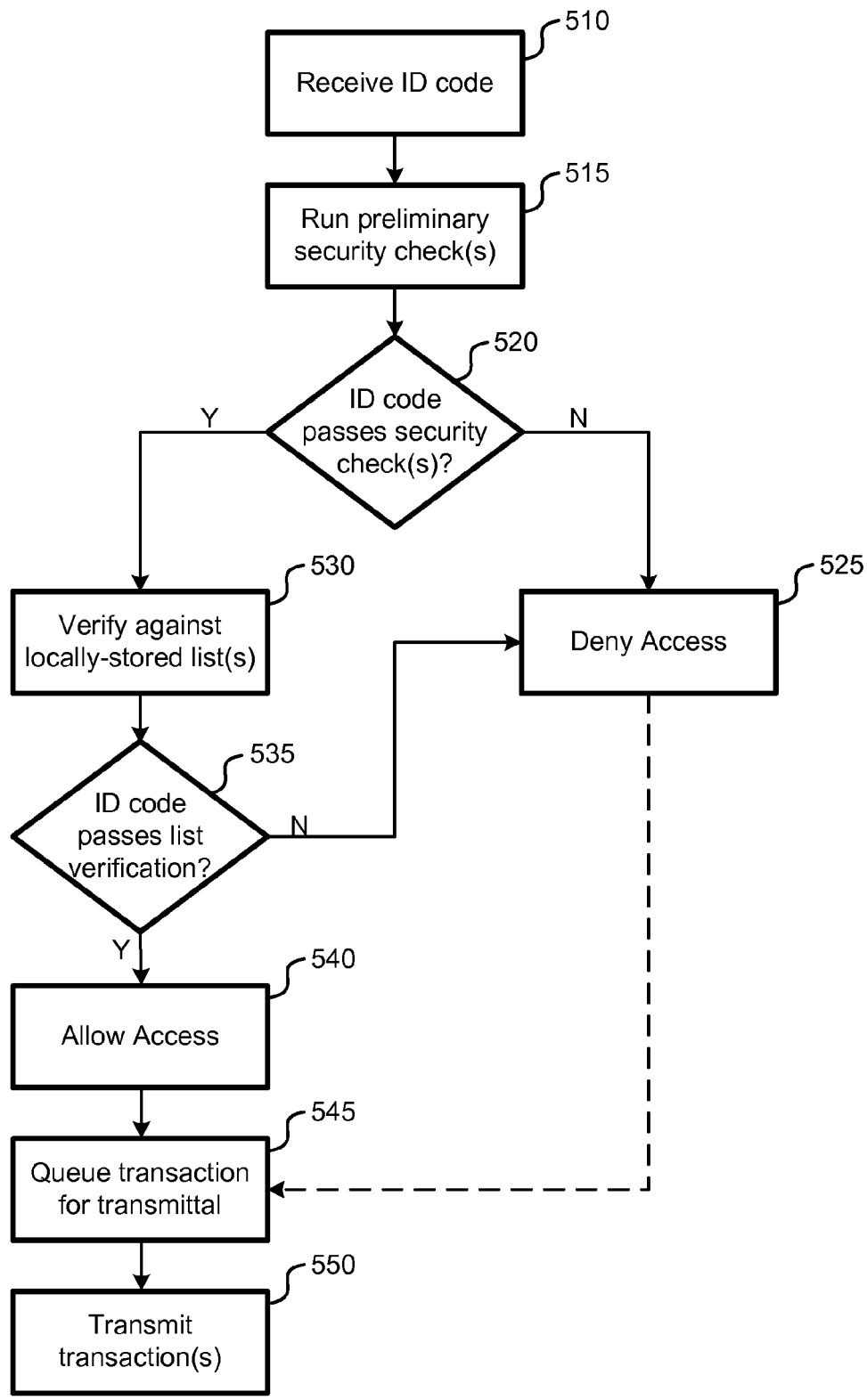
FIG. 5A is a flow chart demonstrating an embodiment of a method of allowing or denying access to a user at an access control point.

FIG. 5A is a flow chart demonstrating an embodiment of a method of allowing or denying access to a user at a transit access control point, which can be performed by access control point processing unit 300, station server 224, some other system in the station system 130, or any combination thereof.

The method can begin at block 510, after receiving an identification code. The identification code can be provided by any fare media having, for example, NFC functionality, an RFID tag, a contactless bank card, a contactless identification card, a magnetic stripe, a bar code, a microprocessor, or other means of communicating fare information, including the identification code.

At blocks 515 and 520, preliminary security check(s) are run to determine whether an identification code passes security check(s). As indicated above, security and/or encryption measures may be taken to reduce falsification of identification codes. Preliminary security check(s) can be used to determine if a card passes or fails these security and/or encryption measures. If the identification code fails to pass the security check(s), a user may be denied passage at an access control point 208, at block 525.

If the identification code passes security check(s), the identification code is verified against locally-stored lists, at block 530. As discussed above, positive and/or negative lists can be stored in memory 320 at access control point processing unit 300, a station server 224, a station data store 216, and/or other device in the station system 130. At block 535, if the identification code fails verification, a user is denied access, at block 525. Otherwise, if the identification code passes verification, the user is granted access at block 540.

Although transactions may be sent from access control point processing unit 300 to station server 224 and/or from station server 224 to central ticketing system 112 in real time, they may be queued for periodic transmittal at block 545, and ultimately transmitted at block 550. By queuing and periodically transmitting transaction information, the traffic on LAN 240 and WAN 140, as well as the processing loads of systems communicating on these networks, may be reduced. It should be understood that, depending on the desired functionality of the system, transaction information may further be transmitted for transactions in which user access at a access control point 208 is denied.

Figure 5B:
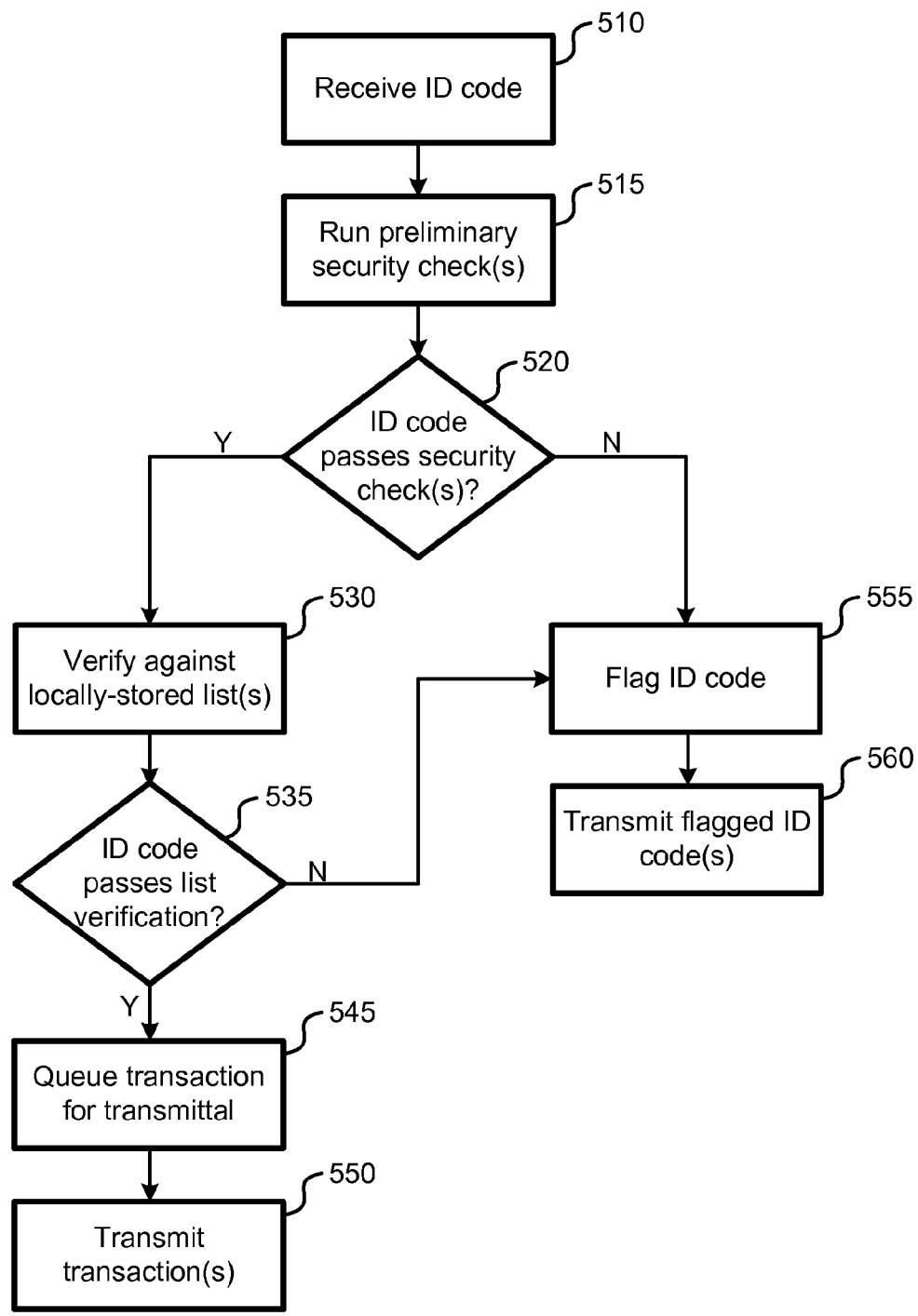
FIG. 5B is a flow chart demonstrating an alternative embodiment of a method of allowing or denying access to a user at an access control point of a transit system, such as an exit access control point.

FIG. 5B is a flow chart demonstrating an alternative embodiment of a method of allowing or denying access to a user at an access control point of a transit system. Steps are followed similar to the method shown in FIG. 5A. This embodiment, however, does not involve allowing passage of a user at an access control point 208. Instead, an identification code of the user is flagged at block 555 if the identification code fails the preliminary security check(s) or the identification code verification. This method may be used at, for example, exit gates of transit system 100. Flagged identification codes can be transmitted at block 560 to the central ticketing system 112, which can then put the flagged identification codes on a negative list and propagate the negative list throughout the transit system 100.

Figure 6:
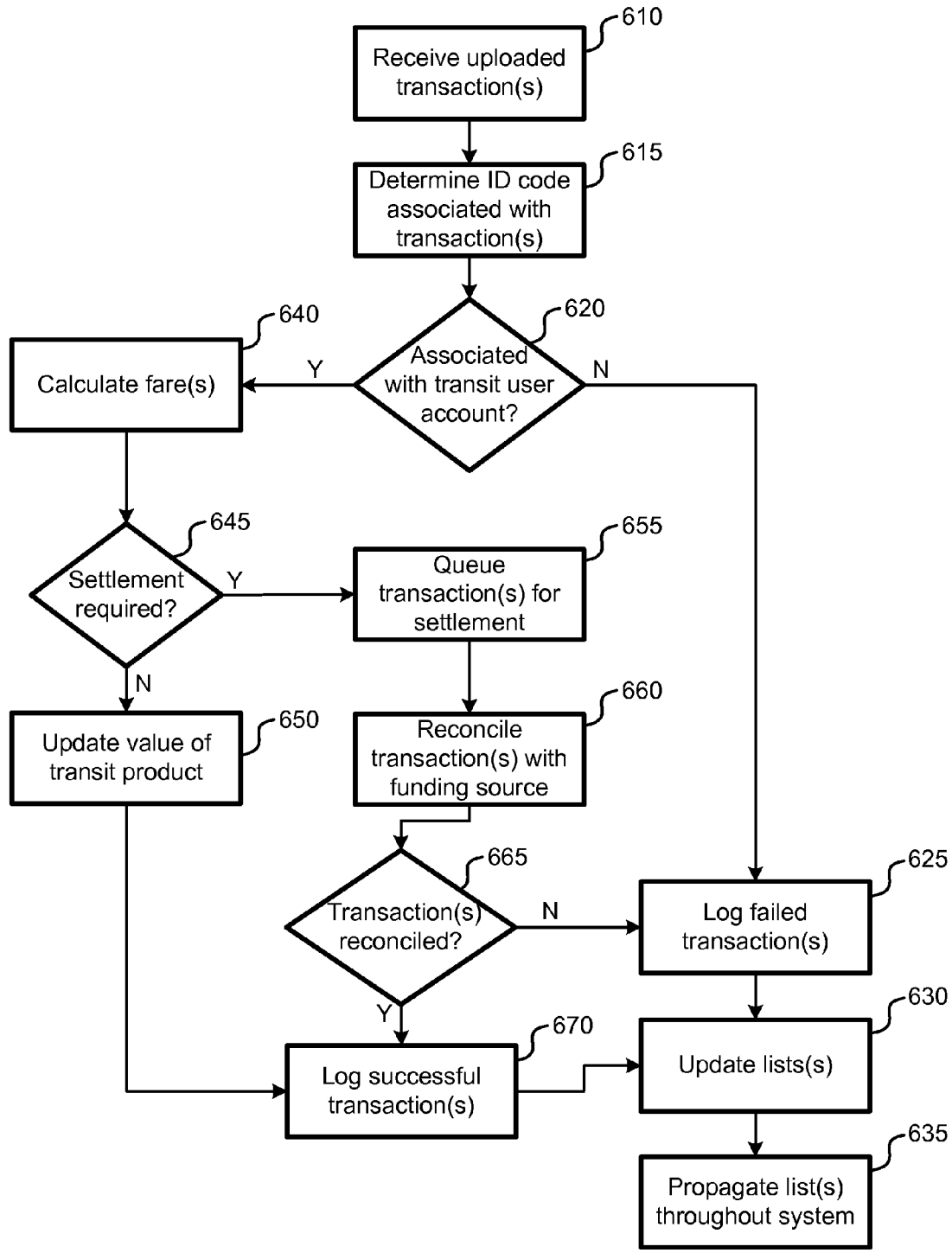
FIG. 6. is a flow chart illustrating an embodiment of a method for processing transactions received from access control points of a transit system.

FIG. 6 is a flow chart illustrating an embodiment of a method for processing transactions received from access control points 208 of a transit system. This method may be used in conjunction with the methods of FIGS. 5A and 5B, as described above. While methods of FIGS. 5A and 5B can be used by devices of a station system 130, the method of FIG. 6 can be performed by a system such as the central ticketing system 112, to process transactions and update transit user accounts.

First, transaction(s) are received, at block 610. An identification code associated with the transaction(s) is then determined at block 615 and associated with a transit user account, at block 620. If the identification code is not associated with an account, the code is invalid and the failed transaction(s) are logged, at block 625. List(s) can then be updated, at block 630. The faulty identification code can, for example, be included on a negative list. Once updated, the lists are then propagated throughout the system, at block 635.

On the other hand, if the identification code is associated with a transit user account, fare(s) for the transaction(s) are then calculated, at block 640. At block 645, it is determined whether settlement with a funding source is required. Some products offered by the transit service provider can, for example, allow unlimited rides for a certain period of time. Other products allow for a certain number of rides or a certain value of credit to be provided to a user before the product expires. In such a case, settlement with a funding source may not be required, and the value of the product associated with the transit user account may be updated, at block 650.

Other instances may require settlement with a funding source. Such instances may include expiration of a product, purchase of a product, or transactions relating to a product requiring frequent settlement with a funding source. In these instances the transaction(s) can be queued for settlement, at block 655, for periodic settlement and settled with the funding source 165, at block 660. If the funding source is unable to fund the payment for the transaction(s) or transaction(s) otherwise fail to settle, the failure is logged at block 625, and list(s) are updated, at block 630, and propagated through the system, at block 635, accordingly.

Otherwise, the successful transaction(s) are logged, at block 670. Successful transaction(s) can impact a list. For example, removal of an identification code associated with successful transaction(s) from a negative list. Thus, list(s) may be updated, at block 630, and propagated throughout the system, at block 635, after successful transaction(s) as well. It will be understood that updating list(s), at block 630, and/or propagating list(s), at block 635, may occur after each instance transactions are logged, and/or they may be updated periodically in batches according to the demands and capacity of the system.

Mobile devices 180 may be used by a user to manage transit user accounts of the transit system 100. Remote account management enables a user to perform many functions, such as check an account balance or purchase an additional product, without the need to go to a TVM 212 or ticket booth. Furthermore, the account management features can be combined with a transit application of an NFC-enabled mobile device 280 to facilitate using the NFC-enabled mobile device 280 both for passage at access control points 208 of the transit system 100 and for account management.

Figure 7A:
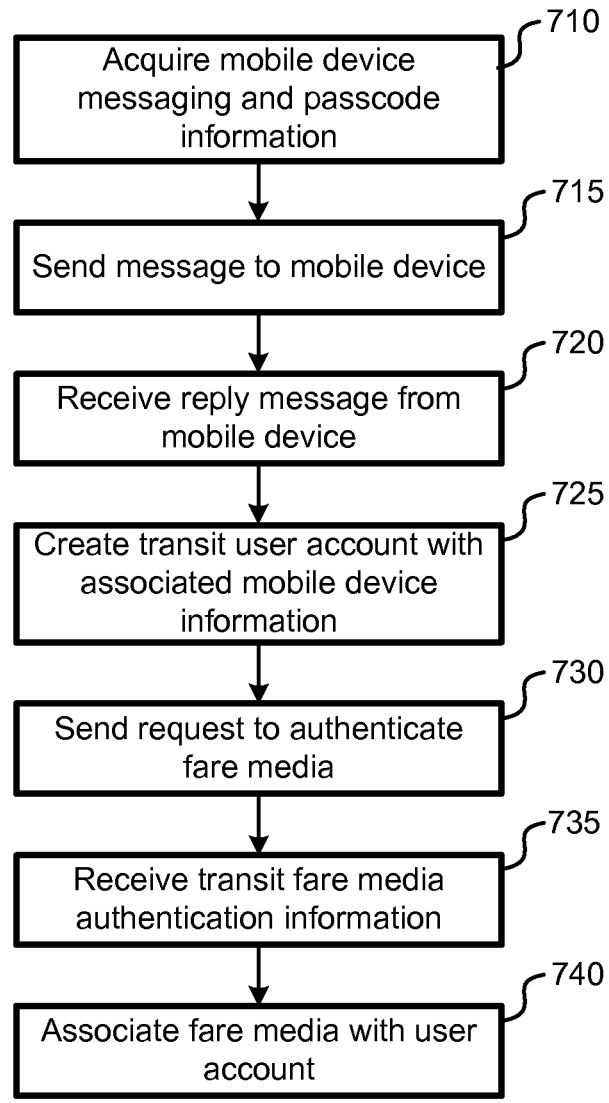
FIG. 7A is a diagram illustrating an embodiment of a method for authenticating a mobile device and associating it with a transit user account.

FIG. 7A is a diagram illustrating an embodiment of a method for authenticating a mobile device 180 (including an NFC-enabled mobile device 280) and associating it with a transit user account. Such authentication may be desired for enabling a mobile device 180 to receive messages from the transit service provider on the mobile device 180 and/or enabling the a user to manage the transit user account with messages sent from the mobile device 180. The method shown in FIG. 7A can be executed by a TVM 212, a station server 224, central ticketing system 112, a customer contact center (e.g., customer service center 190) or device, through a personal computer connected to the Internet, or some combination thereof. Furthermore, user information may be provided with a personal computer, a ticket booth computer, a telephone, the mobile device 180, a TVM 212, or some combination thereof.

At block 710, messaging information for the mobile device 180 is provided, which can be, for example, a phone number, instant messaging account identifier, or email address. A passcode such as a personal identification number (PIN) or password can also be provided. This information may be provided by a user in various ways, such as at a TVM 212, over the phone, on the Internet, in a message sent from the mobile device 180, etc. Once this information is received, a message can be sent to the mobile device 180, at block 715, to authenticate the mobile device 180.

Once a reply message is received from the mobile device 180, at block 720, a transit user account associated with the mobile device messaging and passcode information is created, at block 725, as described above. A request may then be made to the user to authenticate fare media 250, in order to associate with the transit user account. Authentication may require a user to present the fare media 250 to a customer service agent at a ticket booth. Alternatively, a user can present the fare media 250 at a TVM 212, which can read authentication information from the fare media 250. Once the authentication information is received, at block 735, the fare media 250 can be associated with the user account by associating authentication information, such as an identification code, with the account. It will be understood that a user may perform steps at blocks 710 and 735 at the same time, authenticating fare media 250 and providing mobile device messaging information in one transaction. Moreover, according to some embodiments, more than one fare media 250 may be associated with the transit user account.

If a transit user account for the user of the mobile device 180 already exists and fare media 250 is already associated with the account, blocks 725-740 can be omitted. Instead, the messaging and passcode information may be accompanied with an identification code associated with the transit user account, in which case the messaging and passcode information can be associated with the existing transit user account.

Figure 7B:
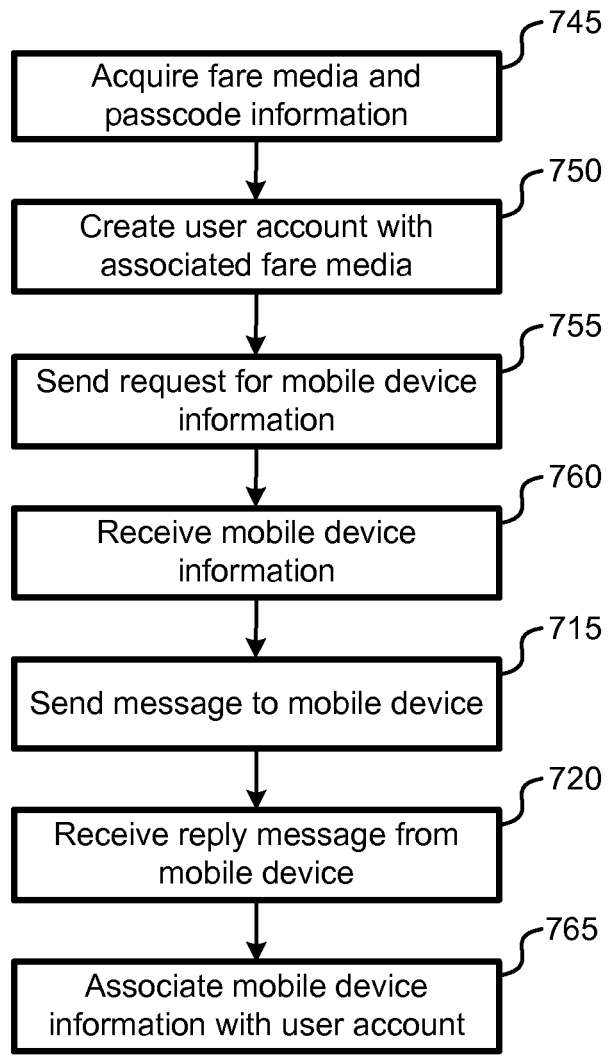
FIG. 7B is a diagram illustrating an alternative embodiment of a method for authenticating a mobile device and associating it with a transit user account.

FIG. 7B is a diagram illustrating an alternative embodiment of a method for authenticating a mobile device 180 and associating it with a transit user account. In this embodiment, information regarding fare media 250 and a passcode is first acquired, at block 745. This can be done by presenting the fare media 250 at a TVM 212, which can read authentication information from the fare media. A transit user account can be created and a mobile device 180 can be authenticated in a manner similar to that shown by FIG. 7A.

Figure 8:
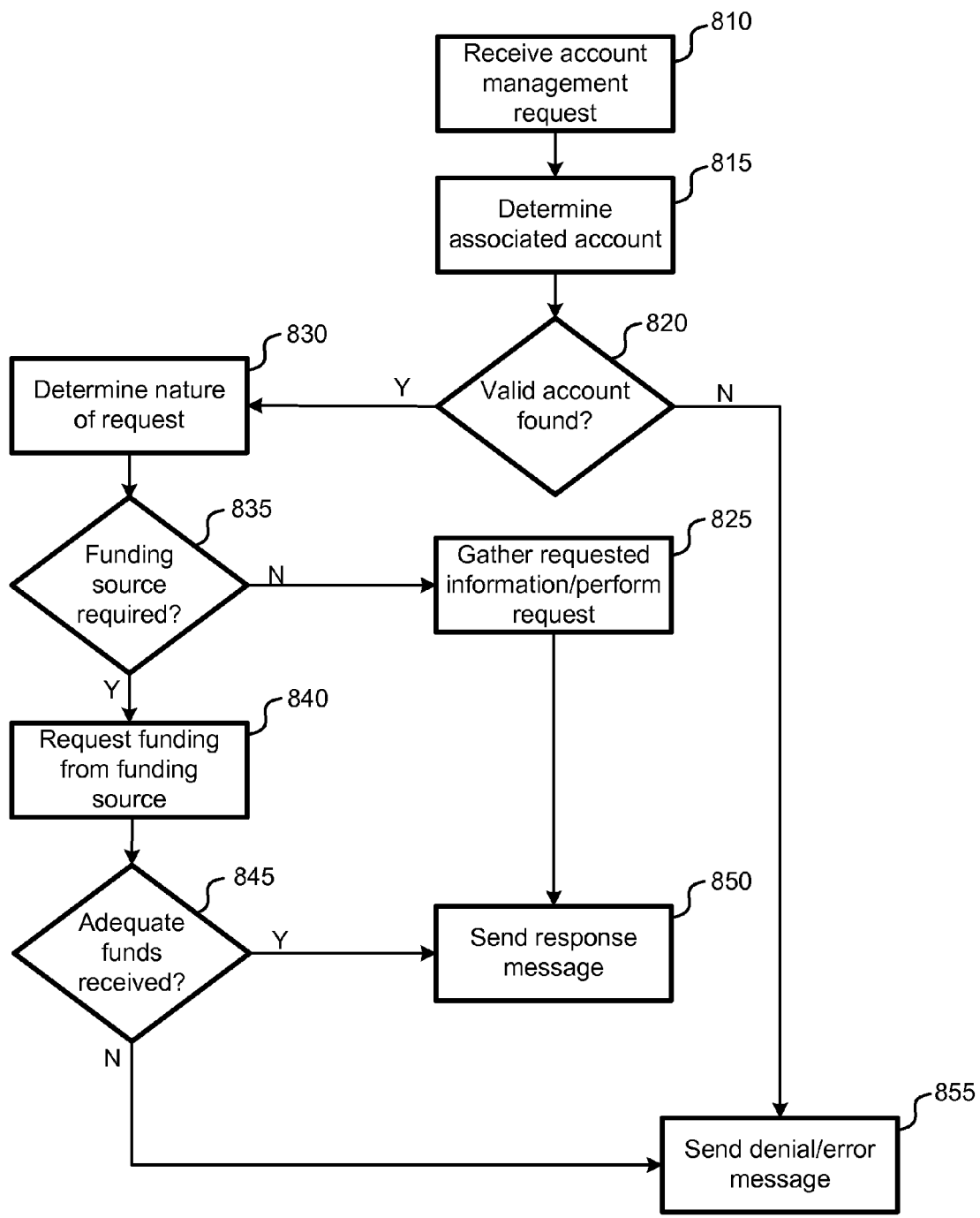
FIG. 8 is a flow chart illustrating an embodiment of a method for responding to account management requests from a mobile device.

FIG. 8 is a flow chart illustrating an embodiment of a method for responding to account management requests from a mobile device 180. After a transit user account has been created and a mobile device 180 associated with the transit user account has been authenticated, by using methods such as those shown in FIGS. 7A and 7B, a user may send messages from a mobile device 180 to a transit services provider to manage the transit user account.

The format and functionality of messages may vary, depending on the desired functionality of such management from a mobile device 180. Short message service (SMS) messages from a registered mobile device 180 can be brief. In such instances, SMS commands from a mobile device 180 may require a simple text command. Table 1 illustrates example text commands that can be used to manage an account.

TABLE 1

SMS Commands

| COMMAND | FUNCTION |
| --- | --- |
| BAL | Show balance of product associated with a transit user account |
| STATUS | Check status of a transit user account (e.g., active or inactive) |
| TOPUP | Add a predetermined amount of value to a product associated with a transit user account |
| ADVAL | Add a specified amount of value to a product associated with a transit user account |
| ENROLL | Enroll fare media |
| ACTIVATE | Request an account or fare media be activated (e.g., associate a fare media with a transit user account) |

For SMS messaging, the transit service provider can further make use of short codes to establish itself with a mobile carrier for easy reference by a user. For instance, a user may send an SMS message "TOPUP CTA," requesting a predetermined amount of value be added to a product associated with a transit user account of a city transit authority (having a shortcode of CTA). A funding source associated with the account may be used to fund the transaction. A full transaction may proceed as shown in Table 2.

TABLE 2

SMS Transaction

| User Message: | TOPUP CTA |
|---|---|
| Transit Message: | Use ~4568 for $25 |
| User Message: | Y |
| Transit Message: | Confirmed add $25. Balance $28.95. |

In the example shown in Table 2, a user requests a top up of their City Transit Authority user transit account, which is associated with the mobile device 180. The user transit account can also be associated with a product. In the example of Table 2, this can be a pay-as-you-go product, which deducts a fare value from an account balance for each ride associated with the transit user account. The transit user account further has an associated funding source 165, an account ending in "4568," and the transit service provider replies to the user request with a confirmation request to fund the user's top up request with a typical top up amount of $25. After the user confirms by sending the message "Y," the transit service provider draws the funds from the funding source 165 and sends a reply message to the mobile device 180 confirming the addition of $25 to the value of the product associated with the user's transit user account and displaying a current balance of $28.95. For embodiments providing multiple fare media to be associated with one transit user account, additional steps may be taken to verify on which fare media the requested actions are intended to be taken.

If a user registers a mobile device 180 for account management as discussed above, a transit service provider can establish itself with the mobile carrier to enable the funding of the transaction to be provided by the mobile carrier and billed to the user of the mobile device 180. Thus, for example, a mobile phone user may use SMS messaging to add value to a product associated with a transit user account. The funding can be provided to the transit service provider by the mobile phone carrier and billed to the mobile phone user as part of the mobile phone user's phone bill. Alternatively, the funding source could be through a financial institution 160, payment card (credit or debit), or ACH transfer.

Other types of messaging can be used. For mobile devices 180 having email or instant message capabilities, the transit service provider can send and receive emails or instant messages for account management functionality similar to that described above. The transit service provider can receive and send messages with central ticketing system 112 and/or another system connected to WAN 140 and/or to mobile carrier network 170.

Turning again to FIG. 8, the embodiment of a method for responding to account management requests from a mobile device 180 illustrated can be executed on a computer system of the transit service provider another system as described above. Beginning at block 810, an account management request is received. The request can include messaging information for the origin, such as a reply email address, phone number, or instant messaging account. This information can be used to determine an associated transit user account 815. At block 820, the messaging information is used to find a valid transit user account. If none is found, a reply message may be sent describing the error, at block 855.

If a valid transit user account is found, the nature of the request is then determined, at block 830. As indicated in Table 1 above, there can be a variety of request associated with managing a transit user account. Because not all requests require a funding source, at block 835 indicates a determination of whether the given request requires a funding source. If the request does not require a funding source, the requisite information is gathered and/or the request is performed, at block 825, and a reply message is sent to the mobile device 180, at block 850.

If funding is required to complete the requested transaction, the request for the requisite funding is made to the funding source, at block 840. If adequate funds are received, a reply message indicating successful funds transfer is sent to the mobile device 180, at block 850, otherwise a denial/error message is sent, at block 855. As with all methods described herein, various embodiments contemplate different variations on the method described in FIG. 8. At block 845, for example, funds can be guaranteed, but not yet received. Other variations are also contemplated.

Figure 9:
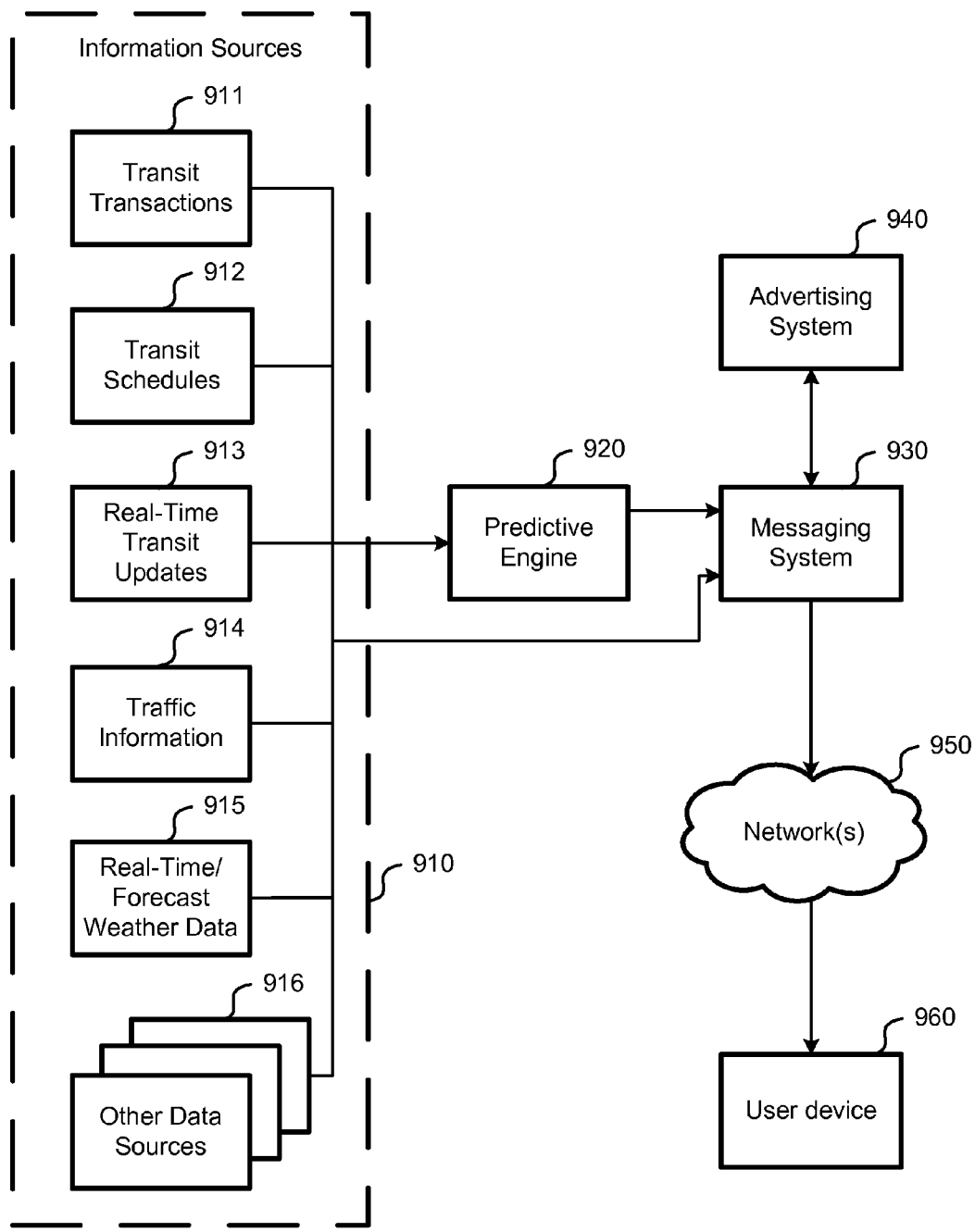
FIG. 9 is a simplified block diagram illustrating an embodiment of a system for transit alerting using predictive techniques.

FIG. 9 is a simplified block diagram illustrating an embodiment of a system for transit alerting using predictive techniques. Location predictions for a particular user can be based on ridership history collected and analyzed by the transit system 100. The ridership history can be used to identify one or more ridership patterns, which can become obvious as regular users often ride the same bus or train at a similar time each day. A location can then be predicted for a transit system user at a given time, and announcements, notifications, marketing messages, and/or other information relevant to the user can be sent to a user device 960 such as a computer, telephone, mobile device 180 (including an NFC-enabled mobile device 280), PDA, e-book reader, etc. Optionally, the user can enroll and potentially pay for these services; the user's transit user account can indicate whether the user has enrolled and/or opted in for these services. The messages can be sent by SMS, email, internet browser, phone application, audio notification by phone, etc.

Messages can contain a variety of helpful items to assist in a patron's daily commute. For example, a time- and/or location-based marketing message can offer a coupon: "Good for one latte at The Coffee Shop at 33rd street station before 9 am on Tuesday March 3rd." A route of line status may include: "The red line is experiencing delays today due to flooding. Suggest taking the green line as alternate route." A message about a new fare product can indicate: "a new fare product was created by the transit service provider that might make your normal commute less expensive . . . . " These and other messages can be based on predicted locations of where a user may be in the future, which can be determined by using identified historical travel pattern(s) of the user.

There are various advantages to knowing where a user will be in the future based on predictive modeling. The alerting message can be better positioned and better aimed at the exact travel patterns of a user minutes, hours, or days in advance. This allows advantageous positioning of the messages giving the user the opportunity to plan in advance based on early warning or early offers. Merchants can thereby drive messaging to impact habits of a user based on predicted modeling. It can further be used to direct the user to new and/or different patterns (i.e. pattern shaping) based on past history and desire to drive new and/or different travel or use patterns. For example, a transit service provider can utilize identified ridership patterns to provide fare tailoring (i.e., providing the best fare and/or individually-tailored planes for a user)

Additional services can be provided based on determination of one or more ridership patterns. For example, a ridership pattern for a transit rider having fare media 250 with a particular identification code can be established. If the transit rider falls out of this pattern for a given day, a message may be sent to a device indicating that the pattern was broken and, if applicable, transit and/or other conditions that may account for the departure in the transit rider's ridership pattern. For example, utilizing an identified ridership pattern and transaction information, the predictive engine 920 or other predictive unit can determine a predicted location for a transit rider and whether the transit rider is at the predicted location at or during a predicted time (by, for example, determining whether the transit rider made a transaction at and access control point 208 at the predicted location during a predicted time or within a certain timeframe of the predicted time). If not, a message can be sent to a user device 960 revealing the change in the transit rider's behavior. Such messaging can be particularly of interest to a parent, having the device receiving the message, who would like to be informed of any departures in the ridership pattern of a child, wherein the child uses the fare media with the particular identification code. In fact, such messaging can be used by any entity who has an interest in monitoring the movement of a transit user within the transit system 100, such as a school administrator monitoring school children, an employer monitoring an employee, a parole officer monitoring a parolee, or any supervisor of a transit user.

Setting up the monitoring of a transit user by a supervisor (e.g., parent, employer, school administrator, etc.) can comprise various steps. A supervisory account may be set up, for example, wherein the account holder and/or supervisor may register one or more fare media (and/or identification codes associated with the one or more fare media) to be associated with the account. Transactions using the registered fare media can thereby be associated with the supervisory account. Preferences may be set for individual fare media (and/or identification codes) to determine, for example, a time window after which message(s) may be sent if the fare media is not used at a predicted location. The use of the fare media at the predicted location is used to determine whether a transit user is at the predicted location. Furthermore, the supervisory account may include contact information of one or more supervisors to which messages can be sent.

Referring again to FIG. 9, a predictive engine 920 can utilize a variety of information sources 910 to determine ridership patterns, predicted locations, predicted time and duration (e.g., length of time) a user may be at the predicted location. Information sources 910 include, but are not limited to, transit transactions 911, transit schedules 912, real-time transit updates 913, traffic information 914, real-time/forecast weather data 915, and other data sources 916. It will be understood that the blocks of FIG. 9 may represent hardware systems of the transit system 100, which can be located at the central control system 110, and/or may represent hardware of a provider external to the transit system 100. Additionally or alternatively, they may also represent virtualized systems that can be executed by other systems, such as central ticketing system 112 and/or other systems connected to WAN 140. Thus, sources can include web pages and other resources available on the Internet.

Transit transactions 911 can provide the basis for predictive modeling. Transactions can be associated with a transit user account, and can include a time, date, and location at which a user associated with the transit user account may have entered or exited a transit station or vehicle (e.g. bus, train, etc.), as well as a destination location and predicted time of arrival. Utilizing information from a plurality of transactions of the user enables predictive engine 920 to determine and/or identify one or more ridership patterns of the user, a predicted location of a user at a predicted time, and a predicted duration the user may be at the predicted location.

Further information may be used to inform the predictions of the predictive engine 920. For example, the predictive engine can use transit schedules 912 and real-time transit updates 912 to determine that the bus a user typically rides has broken down and when the next bus is expected to arrive at the user's location. Such a determination can enable the predictive engine to predict a duration of time the user may be at a certain location. In a similar manner, real-time and/or forecast traffic information 914 and weather data 915 may also be used to inform the predictive engine 920 of when a user may be at a predicted location and for how long.

Not only can information sources 910 inform the predictive engine 920, but they can inform the messaging system 930. Messaging system 930 can receive input from predictive engine 920, information sources 910, and/or advertising system 940 to generate and communicates messages to users. Messaging system 930 can use data and/or information sources, in addition to those used by the predictive engine (such as predicted location and predicted time/duration at the predicted location), to create personalized messages for a user. Messaging system 930 can, for example, utilize transit transaction information 911 to determine destination and/or origin locations of travel to determine possible demographic information.

The messaging system 930 can utilize various types of information to create personalized messages. For example, the messaging system 930 can create messages using information regarding a merchant's proximity to the user's predicted location, a transit service schedule, current and/or future sports, community, and other events within a certain proximity to the predicted location, current and/or forecast weather conditions, current and/or forecast traffic conditions, and information from a governmental transportation authority. As discussed above, the predicted duration of time a user is expected to be at a predicted location may impact the message created by the messaging system 930. For example, an advertisement for a nearby restaurant may be created if a user is expected to be at a predicted location for a long time, whereas a coupon for a nearby coffee shop may be generated if the user is expected to be at the predicted location for a shorter period of time. Information regarding the user device 960 to which the message will be sent, such as whether it is a mobile device 180 and what kind of mobile device it is, can also be used. The messaging system 930 then sends the message through one or more networks 950 (e.g., WAN 140 and/or mobile carrier network 170) to the user device 960.

Embodiments of the disclosed systems and methods contemplate various other data sources 916. As with all information sources 910, the various other data sources may be internal or external to the transit system 100, and may include Internet websites, private data sources, and more. Other data sources 916 can include, for example, information from transportation agencies regarding road constructions and road conditions. Other data sources 916 may further include sources providing information regarding community calendars, sports events, concerts and more. In addition, a user may provide user preferences during, for example, a registration or enrollment process to inform the type and/or frequency of messages sent to the user's device 960. These preferences may be stored in and/or associated with the user's transit user account.

Advertisement information for the messaging system 930 can be generated by advertisement system 940, which can receive and store advertisement information from external sources (not shown), including advertisers. The messaging system 930 can utilize the advertisement information to insert an advertisement or other marketing material into a message. Additionally or alternatively, the messaging system 930 may provide information to the advertising system 940, such as the predicted time and/or location, wherein the advertising system can then create a personalized coupon, advertisement, or other marketing message and return provide it to the messaging system 930. Although the advertisement system 940 can be a part of the transit system 100, it can be external to the transit system 100 and operated by a third-party entity.

Figure 10A:
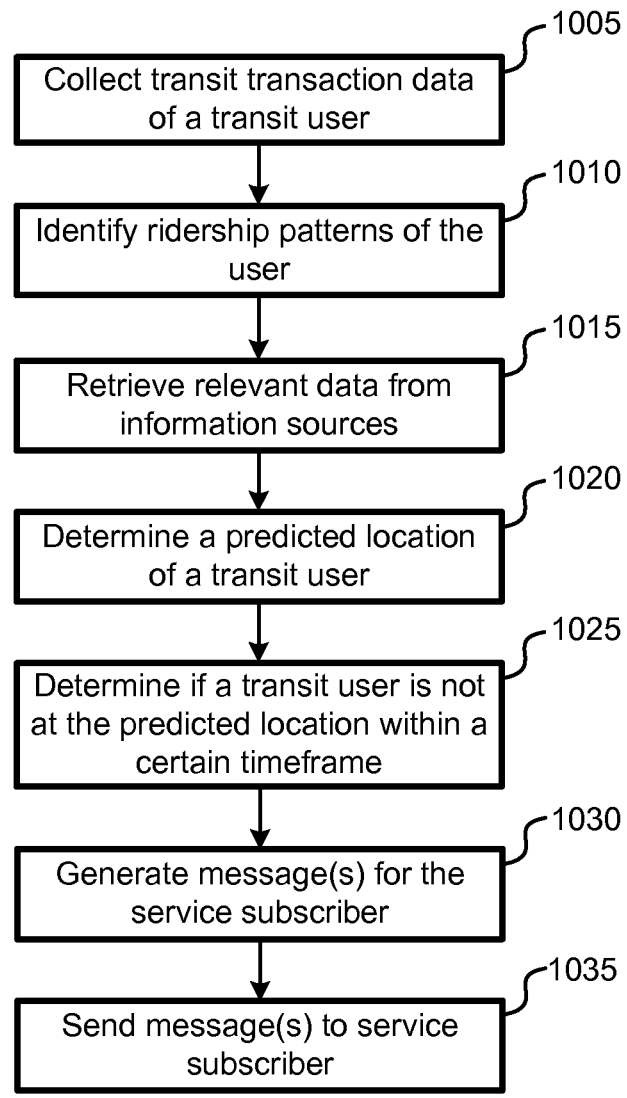
FIG. 10A is a diagram illustrating an embodiment of a method of transit alerting using predictive techniques.

FIG. 10A is a diagram illustrating an embodiment of a method of transit alerting using predictive techniques, this embodiment having particular applicability to sending message(s) to a service subscriber if a transit user does not adhere to one or more established ridership patterns. The method can begin, at block 1005, by collecting transit transaction data of a transit user. As detailed above this may be accomplished by associating an identification code, used for passage at access control points 208 of the transit system 100, with a transit user account. Data mining of the transaction data can then be performed to identify ridership patterns of the user associated with the transit user account, at block 1010.

At block 1015, data from information sources 910 is retrieved. Using identified ridership patterns and other relevant data, a predicted location of a transit user can be determined at block 1020. This can include predicting a time and/or duration of time the user may be at the predicted location. Moreover, because transaction data is utilized, a determination may further be made as to whether the transit user is not at the predicted location within a certain timeframe. Message(s) can then be generated, at block 1030, and sent to a service subscriber, at block 1035, regarding whether the transit user was at a predicted location and/or conditions that may have influenced why the transit user was not at the predicted location.

Figure 10B:
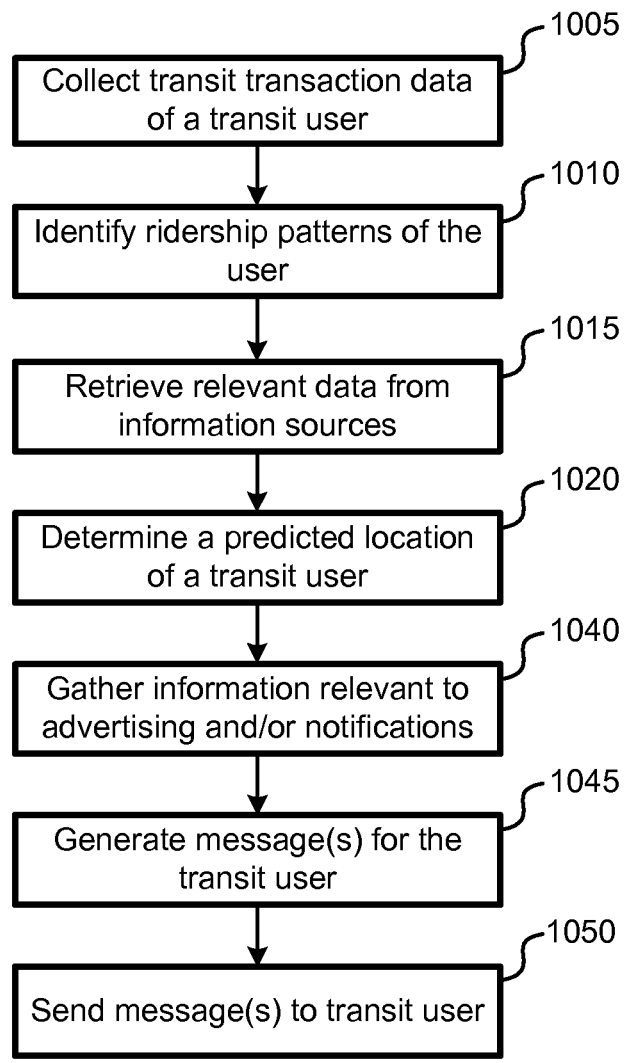
FIG. 10B is a diagram illustrating an alternative embodiment of a method of transit alerting using predictive techniques.

FIG. 10B is a diagram illustrating an alternative embodiment of a method of transit alerting using predictive techniques, this embodiment having particular applicability to sending notifications, marketing messages, and/or transit updates to a transit user. Similar to the steps of FIG. 10A, the method illustrated in FIG. 10B can begin with collecting transit transaction data of the transit user, at block 1005, identifying ridership patterns 1010, retrieving relevant data from information sources, at block 1015, and determining a predicted location of a transit user, at block 1020. The method further comprises gathering information relevant to advertising and/or notifications, at block 1040, generating message(s) for the transit user, at block 1045, and sending messages to the transit user, at block 1050.

As shown above, the account-based transit system 100 can utilize various forms of fare media for transactions of a user in the transit system 100. In addition to fare media discussed above, reloadable prepaid cards, such as general purpose reloadable (GPR) bank cards, can be to be used as fare media in the transit system 100. Reloadable prepaid cards are a particularly convenient form of fare media because they can be issued and/or authorized by a payment brand or their licensed issuing bank, enabling the reloadable prepaid cards to be used for retail purchases at any retail location where the payment brand is accepted. Moreover, widespread use of reloadable prepaid cards as fare media would reduce the burden on transit service providers to obtain and distribute fare media to transit users. Instead, card issuers, such as issuing banks or other financial institutions, can distribute reloadable prepaid cards for use, among other things, in transit. If needed, the transit service provider can determine a value associated with the prepaid reloadable card to provide balance information to a user or for use in determining whether the prepaid reloadable card has sufficient value to fund a transaction. Distribution of such reloadable prepaid cards in high-profile locations, like in a transit setting, is particularly desirable.

Figure 11:
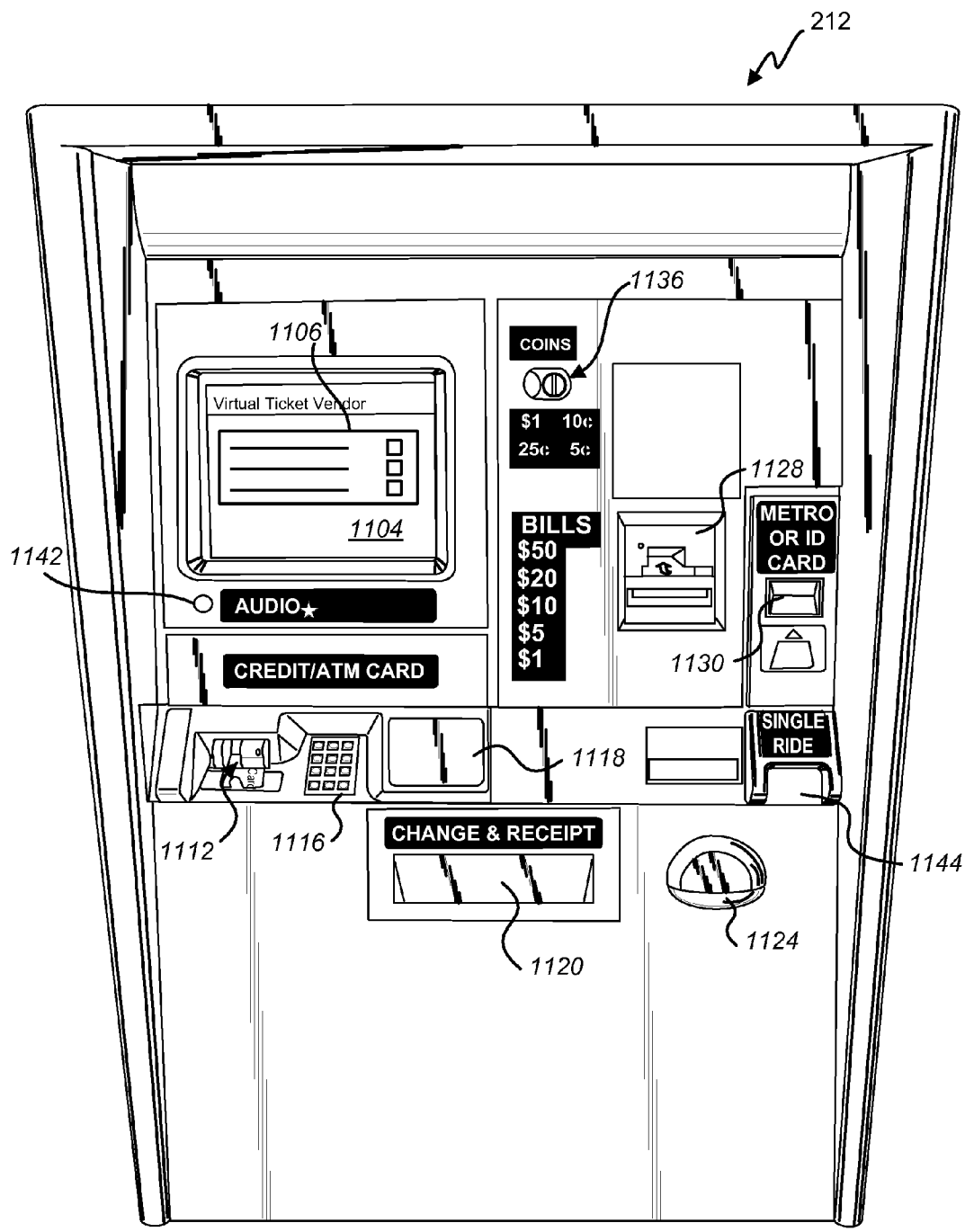
FIG. 11 is an simplified perspective view of an embodiment of a vending machine for concurrently distributing reloadable prepaid cards and creating a transit user account.
Figure 12:
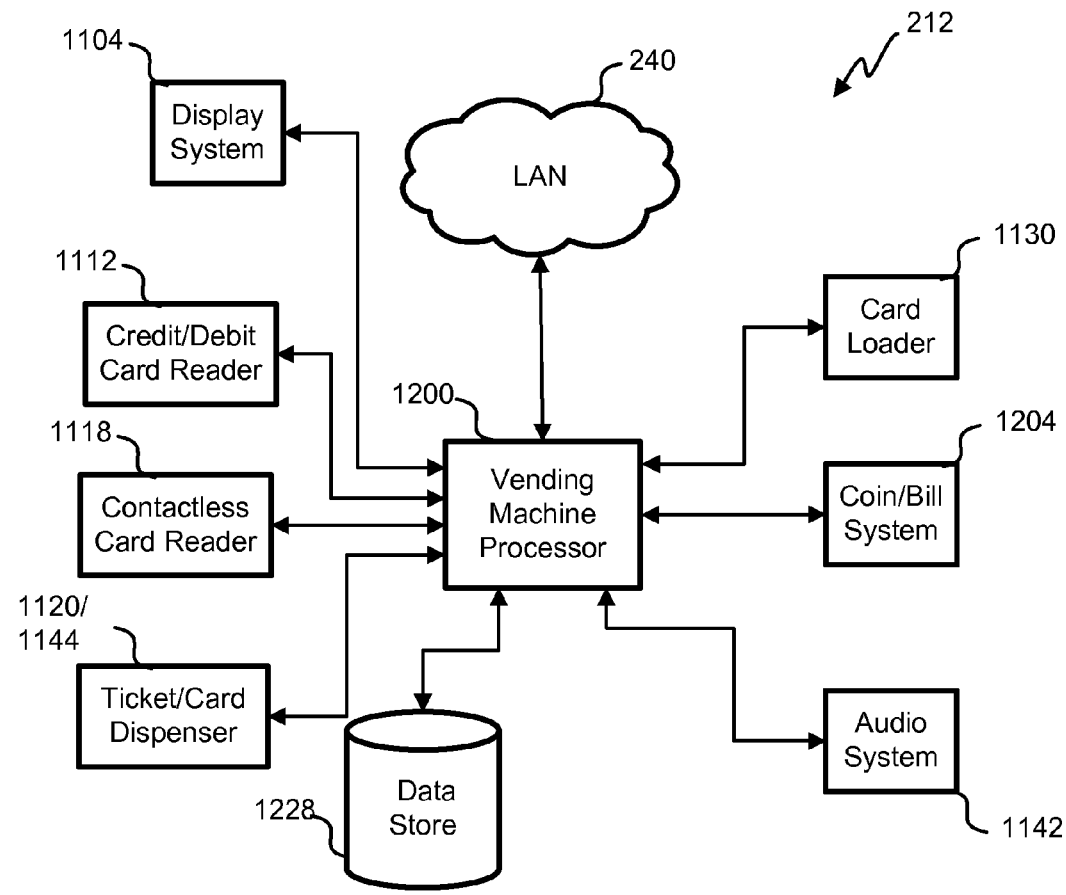
FIG. 12 is block diagram of an embodiment of a vending machine for concurrently distributing reloadable prepaid cards and creating a transit user account.

In FIGS. 11 and 12, a perspective view and block diagram of an embodiment of a TVM 212 are shown. A vending machine processor 1200 is coupled to the other components of the TVM 212 and transmits and receives signals to and from the other subsystems to cause the other components to perform their intended functions. Reloadable prepaid cards and other fare cards can be purchased and/or reloaded with value at the TVM 212. A coin/bill system 1204, credit/debit card reader 1112, and contactless card reader 1118 are used to make payments for transactions at the TVM 212. A pin pad 1116 is provided adjacent to the credit/debit card reader 1112 to enter numerical information such as a PIN code for a debit card. A coin slot 1136 and bill loader 1128 are used to accept cash. Change is returned in a change/receipt slot 1120 and coin return 1124. Newly-issued reloadable prepaid cards, reloadable fare cards, and receipts are also provided in the change/receipt slot. TVM 212 may further dispense single-ride fare cards through card dispenser 1144, which is coupled with a card storage unit (not shown) storing reloadable prepaid cards for distribution. Information regarding transactions may be communicated through a LAN 240 by the vending machine processor 1200 using, for example, a network interface (not shown).

Information regarding transaction may be communicated to various entities. For example, it may be communicated to the central ticketing system 112 to create a transit user account, a card issuer to approve and/or activate a card, or another entity. It will be understood that a card issuer can comprise a financial institution 160, which can receive communication from TVM 121 via financial network 150, central ticketing system 112, and/or WAN 140. Moreover, a prepaid account associated with a reloadable prepaid card may comprise a funding source 165 maintained by a financial institution 160 (which can be the card issuer of the reloadable prepaid card).

A display system 1104 prompts the card holder through the refill/purchase process. For example, the screen prompts the purchaser to touch a start button/icon on a touch screen display of the display system 1104 to begin the process. A textual display portion 1106 can display textual instructions for the user after the process has begun. Additionally or alternatively, an audio system 1142, including a speaker, can produce audio commands. The user can be given a menu of choices of how to proceed. For example, the menu may include choices to purchase a reloadable prepaid card, reload a reloadable prepaid card, purchase a reloadable fare card, reload a reloadable fare card, or purchase a single-ride fare card. It will be understood that, additionally or alternatively to a touch screen display, other input interfaces may be utilized to accept input from a user. This can include, but is not limited to a touchpad, keyboard, mouse, trackball, audio input interface, joystick, etc.

If the user chooses an option requiring payment, the user may be instructed, by menu prompts, pre-recorded video and/or audio, on how to proceed with the payment. The user can be given a choice to pay in cash or by credit/debit card. For cash purchases, the user is instructed to insert coins or bills into the coin slot 1136 or the bill loader 1128. For credit/debit card purchases, the user is instructed to insert a credit or debit card into the credit/debit card reader 1112, or touch an RFID-enabled credit or debit card to contactless card reader 1118. If the user chooses to reload a reloadable prepaid card, the user can insert the reloadable prepaid card into card reader 1112, or touch an RFID-enabled reloadable prepaid card to contactless card reader 1118, and proceed with a cash or credit/debit payment.

Existing TVMs 212, which are almost universally deployed by transit agencies, may be modified to distribute reloadable prepaid cards. Such modification of the machines presents several advantages. First, transit users will have the convenient access to purchase and reload reloadable prepaid cards, register the cards with a transit user account, and manage their account at TVMs 212. Second, card issuers can utilize TVMs 212 that are already deployed and maintained as distribution means for distributing cards to transit users. Third, transit agencies may receive an income stream from card issuers for the deployment and servicing of TVMs 212. Because these machines are already deployed and maintained, and modification expenses are minimal, the marginal cost of including the reloadable prepaid cards is low. This makes money for the transit service provider and reduces the cost of a reloadable prepaid card program.

The activation and distribution of reloadable prepaid cards may further include associating an NFC-enabled mobile device 280 with the reloadable prepaid card. For instance, TVM 212 may further be configured to provision data to the NFC-enabled mobile device 280, such as a primary account number (PAN) of the reloadable prepaid card, as well as digital certificates required for contactless purchases. This information can be stored on a secure memory of the NFC component of the NFC-enabled mobile device 280. The TVM 212 can further be configured to communicate with the card issuer of the reloadable prepaid card to indicate and/or enable the provisioning of data to the NFC-enabled mobile device 280. The NFC-enabled mobile device 280 therefore can be enabled to transmit information of the reloadable prepaid card, and may be used instead of or in addition to the reloadable prepaid card. For example, the NFC-enabled mobile device 280 may be used for transactions inside the transit system 100 (such as at access control points 208) as well as transactions outside the transit system, such as for retail purchases.

Figure 13A:
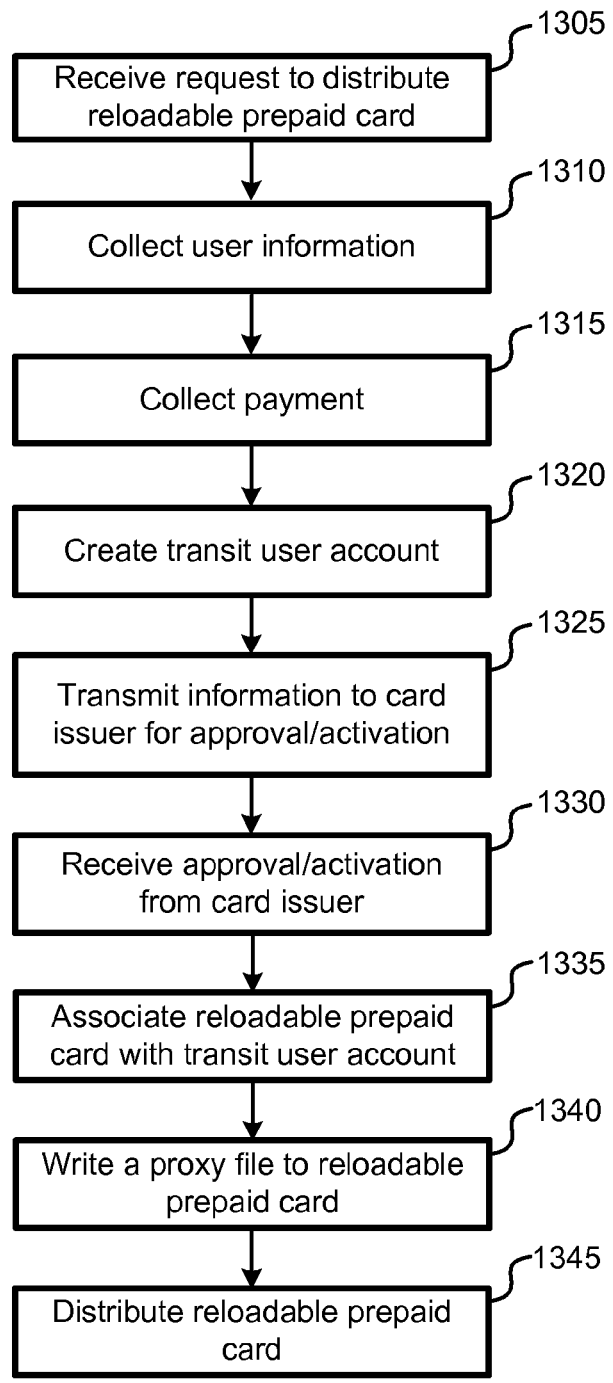
FIG. 13A is a diagram of an embodiment of a method for concurrently distributing reloadable prepaid cards and creating a transit user account.

FIG. 13A is a diagram of an embodiment of a method for concurrently distributing reloadable prepaid cards and creating a transit user account. Beginning at block 1305, a request to distribute a reloadable prepaid card is received. Such a request can come in various forms. For example, a user may request a card by selecting a menu option at a TVM 212.

At block 1310, user information is collected. User information can be minimal. For example, it may only include a unique user identifier and/or passcode (such as a PIN) to be able to be issued a reloadable prepaid card and establish a transit user account. On the other hand, additional user information may be required under know your customer (KYC) and other payment card regulation requirements, which can depend on the amount of value loaded to the reloadable prepaid card to be issued. A transit service provider may also require additional user information for the creation of transit user accounts. Such additional information can include a name, phone number, address, email address, social security number (SSN) or other government-issued identifier, a drivers license number, and/or other identification verification information. A transit service provider may additionally accept user input regarding opt-in or opt-out selections for additional services, user preferences, and/or product(s) for purchase to be associated with a transit user account.

A payment can then be collected, at block 1315. The payment may be used to pay for the reloadable prepaid card, fees relating to the reloadable prepaid card, a value of the reloadable prepaid card, a transit product associated with the reloadable prepaid card, or any combination thereof. Additionally, it can be in any form: cash, credit card, debit card, etc. For example, a user may pay $50 for a reloadable prepaid card, including $5 for the issuing fee, $20 for a 10-ride fare product associated with the reloadable prepaid card, and $25 in value of the reloadable prepaid card for general purchases. The user may then use the issued reloadable prepaid card as fare media in the transit system for 10 rides without altering the $25 value on the reloadable prepaid card. Alternatively, a $50 purchase may include $5 for the issuing fee and $45 in value of the reloadable prepaid card, where fare transactions of the transit system are deducted directly from the value of the reloadable prepaid card.

At block 1320, the transit user account is created. The account can include any or all of the information provided by the user as described above. It may further include other data generated by the transit service provider. Other information may also be provided by the user for the transit user account, such as a funding source like an checking, savings, e-commerce, credit card, or other type of account.

At block 1325, some or all of the information collected at block 1310 is transmitted to a card issuer. The information transmitted can also include an amount of some or all of the collected payment, as well as information about a reloadable prepaid card to be distributed, such as the identification code. The card issuer, which can be the bank or other financial institution that will maintain the prepaid account associated with the reloadable prepaid card, can run compliance or other checks that may be required under government regulations for issuing the reloadable prepaid card. It will be understood that card issuer can simply approve the distribution of the reloadable prepaid card for later activation. For example, a reloadable prepaid card may be distributed to a user who may have to perform additional steps, such as provide identification verification directly to the card issuer via telephone, Internet, etc. The card issuer, at block 1330, can then indicate approval and/or activation.

Upon activation and/or approval of the issuance of the reloadable prepaid card, the reloadable prepaid card can be associated with the account, at block 1335. For example, an identification code for the reloadable prepaid card can be associated with the account. The identification code can comprise, or be generated using, a PAN, expiry date, a bank account number, a card verification value/code, and/or other unique identifier of the reloadable prepaid card.

At block 1340, a proxy file can be written to the reloadable prepaid card. The proxy file can comprise information which can be used in connection with offline or other card transactions. For example, the proxy file can include a shadow balance and last use information to reduce the risk of non-payment at access control points 208 of the transit system 100 that may not be connected with a station server 224. More specifically, a shadow balance can comprise an indication of the reloadable prepaid card balance at terminals which do not have online capabilities, and the last-use information can be used as proof-of-payment.

A proxy file may additionally include data to indicate whether a reloadable prepaid card and/or a transit user account is active. The data may be, for example, a bit of data which, when having a certain value, indicates that the reloadable prepaid card is inactive. Such functionality can be useful in various scenarios. For example, when an access control point 208 cannot access a negative and/or positive list, or the list(s) has not been properly updated, the access control point can deny access when data on the card indicates the card is inactive. This data may be written to the reloadable prepaid card by a TVM 212 or an access control point 208 that determines the card is inactive. (Such a determination can be made by accessing the transit user account and/or a negative list.) For embodiments of a transit system 100 where access control points 208 are configured to allow access where an identification code of a reloadable prepaid card is not on a negative list, reloadable prepaid cards may initially be issued with the data indicating the card is inactive. The reloadable prepaid card may be activated (i.e., proxy file may be written to indicate the card is active) at a TVM 212, ticketing booth, etc., when a transit user account is created and associated with the reloadable prepaid card.

The proxy file can be written to an unused portion of the memory of a prepaid reloadable card, such as unused file space on a integrated circuit smart card using the credit/debit card reader 1112, contactless card reader 1118, card loader 1130, or another card-writing module. Alternatively, reloadable prepaid cards, access control points 208, and TVMs 212 may be equipped with proxy capability, as disclosed by U.S. patent application Ser. No. 12/833,258, filed Jul. 9, 2010, entitled "Proxy-Based Payment System," which is incorporated herein for all purposes. Finally, at block 1345, the reloadable prepaid card is distributed.

Figure 13B:
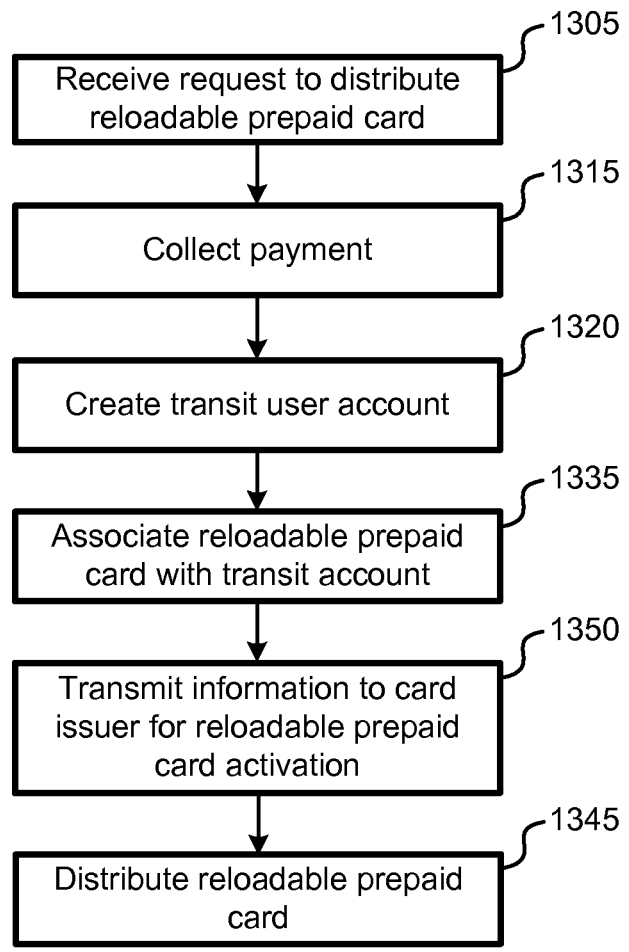
FIG. 13B is a diagram of an alternative embodiment of a method for concurrently distributing reloadable prepaid cards and creating a transit user account.

FIG. 13B is a diagram of an alternative embodiment of a method for concurrently distributing reloadable prepaid card and creating a transit user account. In this embodiment, minimal user information, if any, is collected. Instead, a user can remain anonymous, and a transit user account can be created and associated with the reloadable prepaid card, at blocks 1320 and 1335. The transit user account in this case may include information only about the reloadable prepaid card and perhaps a transit product. At block 1350, information is transmitted to a card issuer for reloadable prepaid card activation, such as a card identification code and a value amount. Under current government regulations, a user can be allowed to remain anonymous under certain conditions. Thus, approval of a user for a reloadable prepaid card may not be required; the reloadable prepaid card may only need to be activated. It will be understood that the card issuer may require a user to take additional steps to activate a reloadable prepaid card.

Figure 13C:
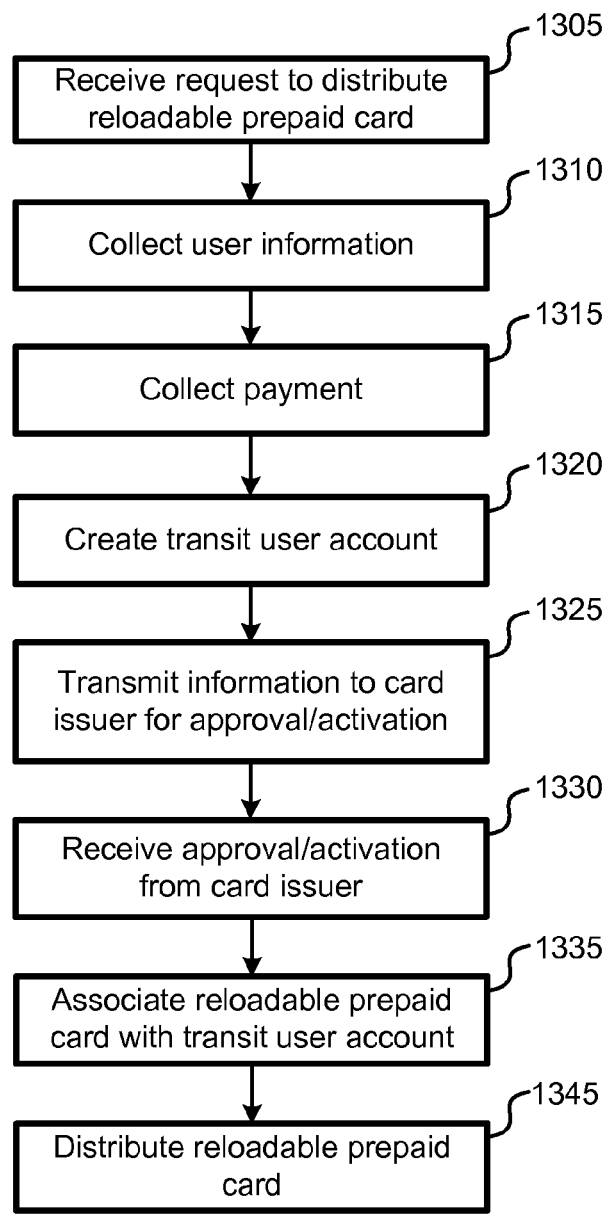
FIG. 13C is a diagram of yet another embodiment of a method for concurrently distributing reloadable prepaid cards and creating a transit user account.

FIG. 13C is a diagram of yet another embodiment of a method for concurrently distributing reloadable prepaid cards and creating a transit user account. This embodiment, which is similar to the embodiment of FIG. 13A, illustrates how the writing of a proxy file to the reloadable prepaid card may be omitted.

Figure 13D:
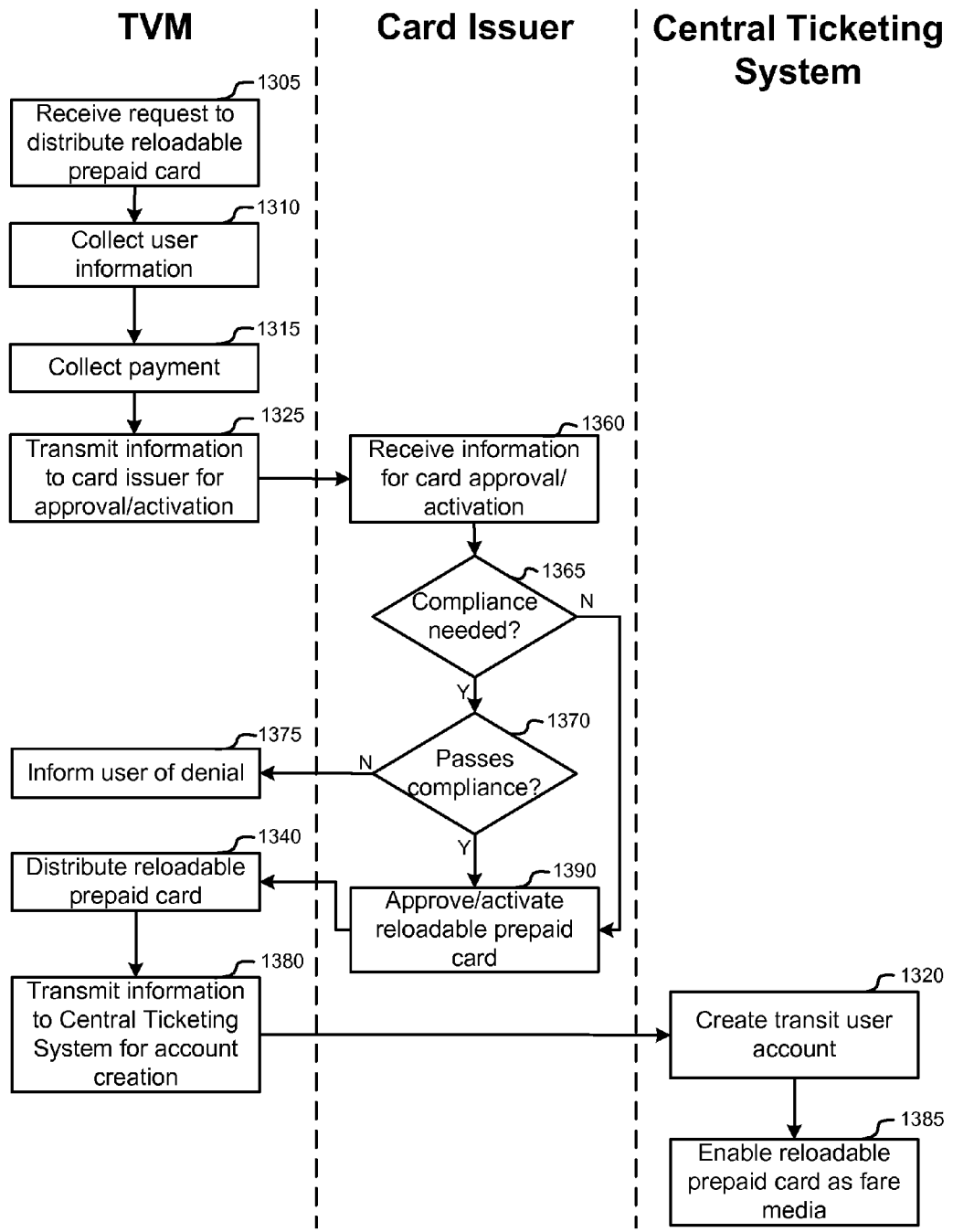
FIG. 13D is a swim-lane diagram of yet another embodiment of a method for concurrently distributing reloadable prepaid cards and creating a transit user account.

FIG. 13D is a swim-lane diagram of yet another embodiment of a method for concurrently distributing reloadable prepaid cards and creating a transit user account, illustrating how the steps of the method may be performed by a TVM 212, a central ticketing system 112, and a card issuer (such as a financial institution 160).

The method can begin at block 1305, when TVM 212 receives a request to distribute a reloadable prepaid card. For example, a user may press a menu option on the display 1104 of TVM 212. At block 1310, information is collected from a user at the TVM. As discussed above, this information may vary depending on the functionality requirements of a transit services provider, regulations regarding user information for reloadable prepaid cards meeting certain criteria, etc. At block 1315, TVM 212 can receive payment from a user, and at block 1325, the TVM 212 transmits information to a card issuer for approval and/or activation. In addition to the user information collected at block 1310, the information transmitted at block 1325 can include all or part of a payment amount, an identification code of a reloadable prepaid card to be distributed, and other information that may be required by the card issuer.

At block 1360, the card issuer receives the information transmitted by the TVM 212. Using the transmitted information, such as a payment amount, card issuer can determine whether compliance checks are needed, at block 1365. Compliance checks may include checking certain information against government lists as required by government regulations, checks internal to a financial institution or network, or other types of information verification. If such compliance checks are not needed, the card issuer can simply approve and/or activate the reloadable prepaid card, at block 1390. If the compliance checks are needed, the card issuer can run checks to determine whether or not the transmitted information passes compliance, at block 1370. If the information fails compliance checks, the card issuer can inform the TVM 212 that the request for a reloadable prepaid card has been denied, and the TVM 212 can inform the user of the denial 1375.

At block 1390, if the card issuer determines that the information has passed compliance checks, the card issuer can approve and/or activate the reloadable prepaid card. The card issuer can inform the TVM 212 of the approval and/or activation, which can distribute the reloadable prepaid card, at block 1340. The TVM 212 can then transmit information to the central ticketing system 112 for creation of a transit user account, at block 1380. The information transmitted by the TVM 212 to the central ticketing system 112 can include user information collected at block 1310, payment information, information from the card issuer transmitted along with the approval/activation indication, and other information that can be included in the transit user account as desired by the transit services provider.

In response to receiving the information, the central ticketing system 112 can create the transit user account at block 1320, and enable the reloadable prepaid card to be used as fare media 250 in the transit system 100, at block 1385. Enabling the reloadable prepaid card to be used as fare media 250 in the transit system 100 can comprise different steps, depending on the functionality of the transit system. For example, the central ticketing system 100 may generate and/or update lists to include the information code of the reloadable prepaid card and propagate the lists to station servers 224 and/or access control points 208 of the transit system. Additionally or alternatively, enabling a reloadable prepaid card for use at access points in the transit system 100 could simply entail storing and/or otherwise associating the identification code of the reloadable prepaid card with the transit user account.

It will be understood that any number of variations may be made on the embodiment of FIG. 13D. Distributing a reloadable prepaid card to the user at block 1340, for instance, could occur after a transit user account has been created. Block 1380, where a TVM 212 transmits information to central ticketing system 112 could take place after the TVM requests and receives additional information and/or input from the user. A card issuer may request additional information, such as identification verification information, from user at the TVM 212 after information is received at block 1360, but before the reloadable prepaid card is approved/activated at block 1390. Other embodiments are considered.

Figure 14:
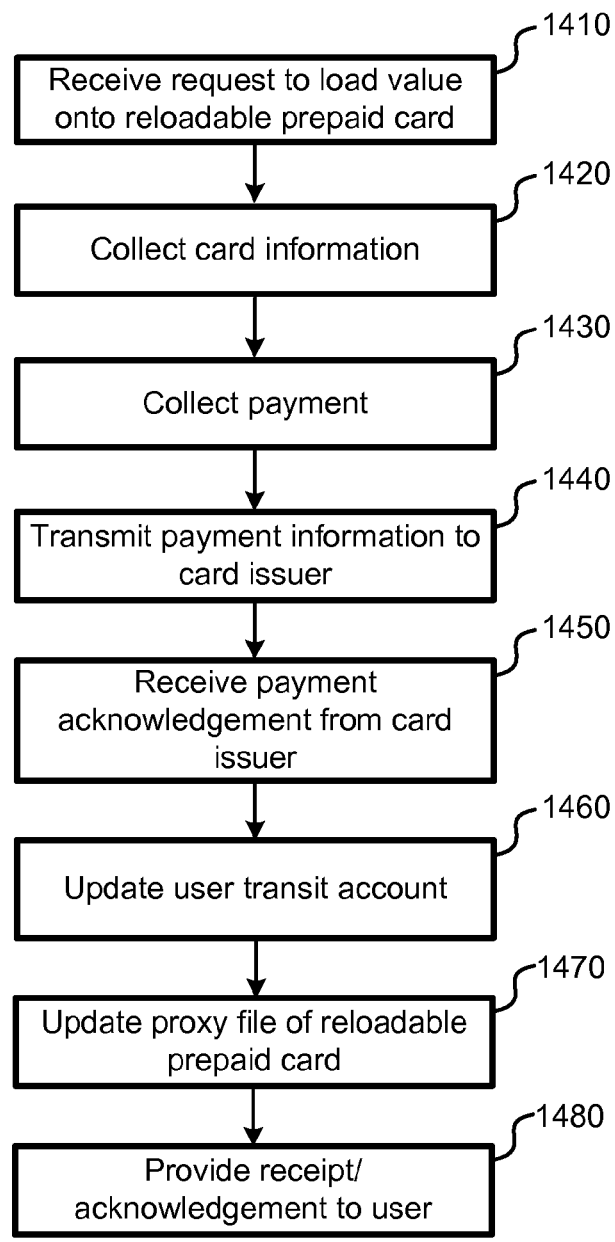
FIG. 14 is a diagram of an embodiment of a method for reloading a reloadable prepaid card.

FIG. 14 is a diagram of an embodiment of a method for reloading a reloadable prepaid card, which can be initiated by a user a TVM 212. At block 1410, a request is received to load value onto the reloadable prepaid card, and at block 1420 the card information is collected. Card information can include an identification code for the reloadable prepaid card. This may be collected, as discussed above, by inserting the reloadable prepaid card into a card reader 1112, or touching an RFID-enabled reloadable prepaid card to a contactless card reader 1118 of the TVM 212.

Following steps similar to those taken when activating a reloadable prepaid card, a payment is collected at block 1430, payment information is transmitted to the card issuer at block 1440, and an acknowledgement of payment is received from the card issuer at block 1450. Depending on the arrangement between the card issuer and the transit services provider, the payment information transmitted to the card issuer may include all or a portion of the payment collected at block 1430. For example, payment information may include an amount equal to the amount of the payment collected minus a fee for reloading the reloadable prepaid card. Along with payment information, identification information for the reloadable prepaid card such as the identification code, can be transmitted to the card issuer.

At block 1460, the user transit account is updated. This can include merely associating the reload transaction with the user transit account, updating a value of a transit product associated with the account, and/or updating other information of the account. The update to the account can be performed by central ticketing system 112 and may impact the positive and/or negative list(s) propagated throughout the transit system 100.

At block 1470, if a reloadable prepaid card includes a proxy file, the proxy file can be updated. For a user at a TVM 212, this may require the user to insert the reloadable prepaid card into a card reader 1112, or touch the RFID-enabled reloadable prepaid card to a contactless card reader 1118. Updates to the proxy file can include updates to the shadow balance and last use information as reflected by the reloading of the reloadable prepaid card. Finally, at block 1480, a receipt and/or other payment acknowledgement may be provided to the a user.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
  receiving, at a transit system from a mobile device, an account management request that includes information identifying the mobile device and a particular account management command;
  associating, by the transit system, the mobile device with a transit user account based on the information identifying the mobile device;
  determining, by the transit system, whether funding is required to implement the particular account management command;
  sending, by the transit system to a funding source associated with a user of the mobile device, a request for transfer of funds to a product associated with the transit user account when funding is required to implement the particular account management command; and
  sending, by the transit system to the mobile device, an account management response that includes an indication of completed transfer of funds to the product associated with the transit user account when the transfer of funds is complete, and an indication of incompleted transfer of funds to the product associated with the transit user account when the transfer of funds is incomplete.

2. The method of claim 1, further comprising determining whether a transaction fee is associated with the account management request.

3. The method of claim 2, further comprising determining that a transaction fee of zero amount is associated with the account management request.

4. The method of claim 3, wherein:
  the account management request comprises a query to identify a balance of the transit user account; and
  the account management response specifies the balance of the transit user account.

5. The method of claim 3, wherein:
  the account management request comprises a query to determine a status of the transit user account; and
  the account management response specifies the status of the transit user account as active or inactive.

6. The method of claim 3, wherein:
  the account management request comprises a command to enroll with the transit system particular transit fare media other than the mobile device; and
  the account management response includes confirmation of enrollment of the particular transit fare media with the transit system.

7. The method of claim 3, wherein the account management request comprises a command to activate particular transit fare media other than the mobile device, the method further comprising:
  associating the transit user account with the particular transit fare media such that the transit fare media can be used in transactions with the transit system; and
  including, in the account management response, confirmation of activation of the particular transit fare media with the transit system.

8. The method of claim 2, further comprising determining that a transaction fee of non-zero amount is associated with the account management request.

9. The method of claim 8, wherein:
  the account management request comprises a command to add a predetermined amount of value to a product associated with the transit user account; and
  the account management response specifies confirmation or denial of addition of the predetermined amount of value to the product associated with the transit user account.

10. The method of claim 8, wherein:
  the account management request comprises a command to add a user-specified amount of value to a product associated with the transit user account; and the account management response specifies confirmation or denial of addition of the user-specified amount of value to the product associated with the transit user account.

11. A computing system, comprising:

at least one processor; and a memory communicatively coupled to at least one processor, the memory storing instructions that, when executed by the at least one processor, cause the at least one processor to implement at least one module to enable a user of a mobile device to manage a transit user account using the mobile device, the transit user account associated with the mobile device and used in transactions with a transit system, the at least one module configured to:

detect receipt, from the mobile device, of an account management request that includes information identifying the mobile device and a particular account management command;

determine whether funding is required to implement the particular account management command;

send to a funding source associated with the user of the mobile device a request for transfer of funds to a product associated with the transit user account when funding is required to implement the particular account management command; and send to the mobile device an account management response that includes an indication of completed transfer of funds to the product associated with the transit user account when the transfer of funds is complete, and an indication of incompleted transfer of funds to the product associated with the transit user account when the transfer of funds is incomplete.

12. The computing system of claim 11, wherein the at least one module is further configured to determine whether the transit user account is a valid account prior to a sending of the account management response message.

13. The computing system of claim 12, wherein the at least one module is further configured to send an error message to the mobile device upon determination that the transit user account is an invalid account.

14. The computing system of claim 11, wherein the at least one module is further configured to, prior to a sending of the account management response message, determine whether a transaction fee is associated with the account management request message.

\* \* \* \* \*